US 6,586,913 B2

(12) United States Patent
Rolfes

(10) Patent No.: US 6,586,913 B2
(45) Date of Patent: Jul. 1, 2003

(54) AUTOMATIC BATTERY CHARGER WITH VOLTAGE CONTROLLED CHARGING AND RIPPLE VOLTAGE TEST

(75) Inventor: Michael J. Rolfes, Bridgeton, MO (US)

(73) Assignee: Associated Equipment Corporation, St. Louis, MO (US)

( * ) Notice: Subject to any disclaimer, the term of this patent is extended or adjusted under 35 U.S.C. 154(b) by 16 days.

(21) Appl. No.: 09/891,816

(22) Filed: Jun. 26, 2001

(65) Prior Publication Data

US 2002/0033691 A1 Mar. 21, 2002

Related U.S. Application Data

(60) Provisional application No. 60/215,613, filed on Jun. 30, 2000, and provisional application No. 60/243,202, filed on Oct. 25, 2000.

(51) Int. Cl.$^7$ ............................. H02J 7/14; H02J 7/00
(52) U.S. Cl. ......................... 320/162; 320/139
(58) Field of Search .............................. 320/162, 139, 320/143, 163, 164

(56) References Cited

U.S. PATENT DOCUMENTS

| | | | |
|---|---|---|---|
| 3,748,568 A | 7/1973 | Ackermann | |
| 4,956,597 A | * 9/1990 | Heavey et al. | 320/129 |
| 5,166,595 A | 11/1992 | Leverich | |
| 5,200,877 A | 4/1993 | Betton et al. | |
| 5,307,001 A | 4/1994 | Heavey | |
| 5,523,671 A | 6/1996 | Stewart | |
| 5,744,932 A | 4/1998 | Kissel | |
| 5,754,028 A | 5/1998 | Vezzini | |
| 5,804,944 A | 9/1998 | Alberkrack et al. | |
| 5,808,443 A | 9/1998 | Lundstrom | |
| 5,828,202 A | 10/1998 | Tamai | |
| 5,895,440 A | 4/1999 | Proctor et al. | |
| 6,037,751 A | * 3/2000 | Klang | 320/129 |
| 6,184,650 B1 | * 2/2001 | Gelbman | 320/100 |

* cited by examiner

Primary Examiner—Gregory J. Toatley, Jr.
(74) Attorney, Agent, or Firm—Senniger, Powers, Leavitt & Roedel

(57) ABSTRACT

A method and apparatus for charging a battery. A voltage controlled charger applies an initial charging signal and measures the battery terminal voltage. If the measured terminal voltage exceeds an upper threshold, the charger reduces the charging signal. If the measured terminal voltage falls below a lower threshold, the charger increases the charging signal. If the measured terminal voltage falls between the upper and the lower thresholds, the charger maintains the charging signal. Thereby, the charger substantially prevents the charging signal from exceeding the battery gassing potential during the charging process. The method and apparatus also desulfate deeply discharged batteries. The method and apparatus monitor a ripple voltage associated with the battery terminals to assess battery charge acceptance and battery quality. The amount of tolerable ripple voltage preferably decreases as the charging process proceeds.

32 Claims, 13 Drawing Sheets

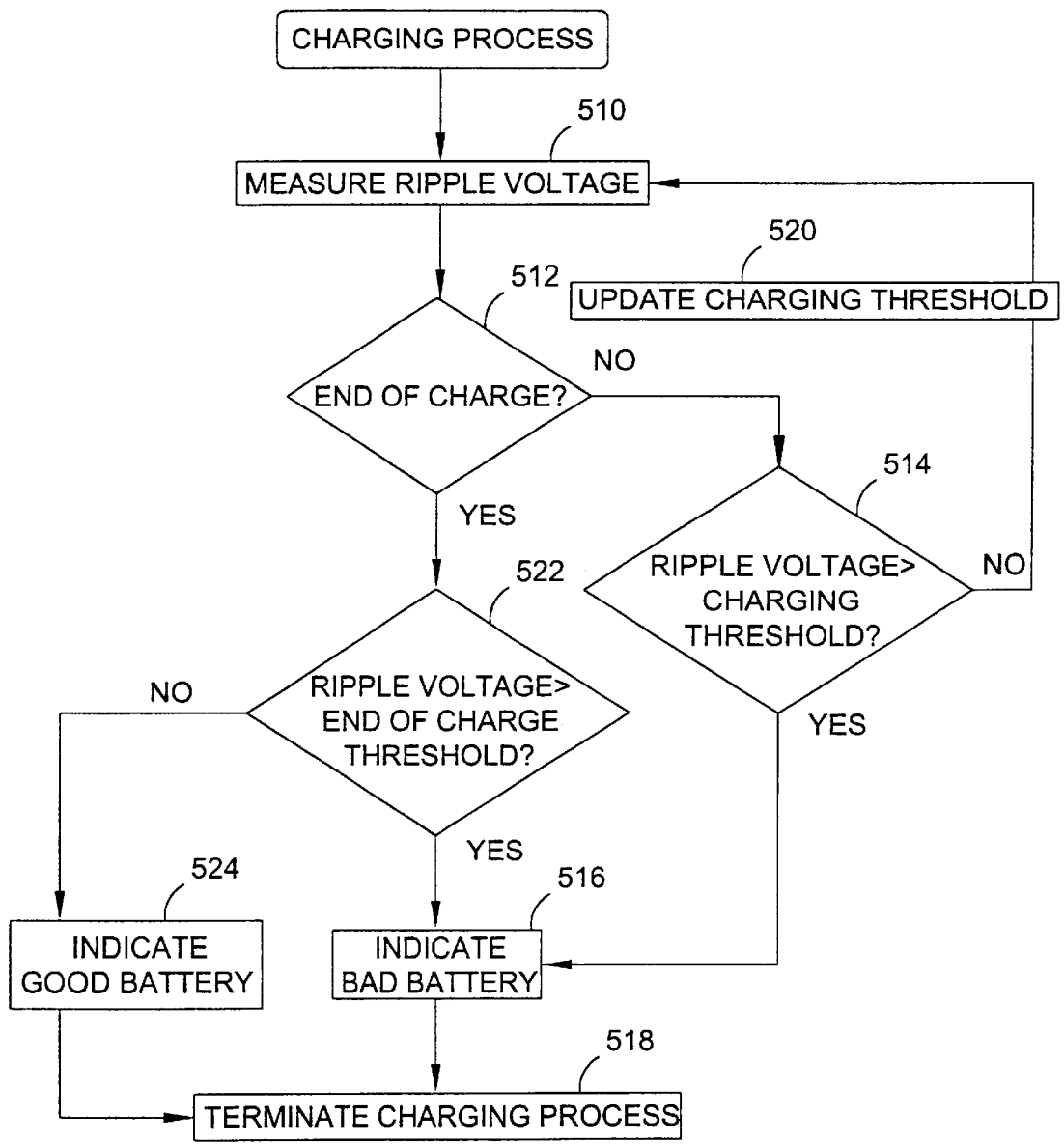

US 6,586,913 B2

AUTOMATIC BATTERY CHARGER WITH VOLTAGE CONTROLLED CHARGING AND RIPPLE VOLTAGE TEST

CROSS-REFERENCE TO RELATED APPLICATIONS

The invention of the present application claims priority based on U.S. Provisional Patent Application Ser. No. 60/215,613, filed on Jun. 30, 2000, and U.S. Provisional Patent Application Ser. No. 60/243,202, filed on Oct. 25, 2000.

BACKGROUND OF THE INVENTION

The invention relates generally to improvements in battery chargers. In particular, the invention relates to a system and method for charging a lead acid battery below the battery gassing potential, desulfating deeply discharged lead acid batteries, and analyzing the quality of a battery being charged.

It is typically undesirable to charge a sealed battery, also called Valve Regulated Lead Acid (VRLA) battery, above its electrolyte gassing potential, or simply "gassing potential." The gassing potential relates to the open circuit terminal voltage at or above which electrolyte begins to evaporate. In a typical VRLA battery, any generated gas is vented through a relief valve and cannot be replaced by adding water, as is commonly done with conventional/flooded batteries. Hence, gassing results in reduced battery capacity due to the reduced electrolyte.

Even at low charging currents, the potential exists for thermal runaway and, possibly, battery melt down. Thermal runaway may occur during charging when the rate of internal heat generation, resulting from the exothermic reaction at the negative plate due to oxygen recombination, exceeds the rate at which the generated heat can be dissipated. Undercharging, however, is not a satisfactory solution to such heat problems because undercharging a battery severely shortens the number of charge-discharge cycles that such a battery may experience before it fails.

It has been discovered that when a typical battery's state of charge is less than 50 percent of its capacity, virtually all of the charging current supplied is consumed in charge reactions and no gas is produced. Thus, when charging such low charge state sealed batteries, any concerns for gassing are typically diminished. If, however, the battery charge state exceeds roughly fifty percent, the potential for gassing increases. In the latest stages of the charging process, for example, battery chargers often supply voltages at which some, or even most, of the input current is consumed in the gassing process.

Apart from gassing, there are other problems associated with charging lead acid batteries. A deeply discharged battery often demonstrates a very low initial charge acceptance. In other words, deeply discharged batteries resist charging. The problem typically worsens if the discharged battery is allowed to sit for a long period of time (e.g., weeks or months) in the deeply discharged state. A condition known as sulfation causes this charge resistance.

Sulfation occurs when sulfur from battery acid (sulfuric acid) deposits on the plates of a battery. Sulfation severity increases as a battery discharges. Sulfation adversely affects charge acceptance because the sulfation process causes electrolyte inefficiency due to the reduction of sulfur in the electrolyte.

When a battery has not been allowed to deeply discharge, the normal recharging process removes a sufficient amount of the sulfation film, thereby allowing a satisfactory recharge. If the sulfation problem is severe, it becomes impractical to recharge the battery. Moreover, severe sulfation or repeated sulfation can result in plate erosion, which, in turn, adversely affects battery performance.

As already indicated, a sulfated battery initially accepts very little charge current, even though the applied voltage may be quite substantial. As the charging process continues, the sulfate crystals break down, allowing an increased charge current and increased charge acceptance. Prior art battery chargers, however, often use automatic controllers that step down to stay below some voltage limit, and as such, do not properly step back up as the sulfated battery begins to accept charge. Further, prior art constant current battery chargers either provide too little charge current when the battery charge state is less than 50 percent, or provide too much current at higher charge states.

Further, when attempting to charge a battery, it may not be known whether the battery can be recovered. In other words, a weak battery may be subjected to an entire charging process before it is determined that the battery is not serviceable.

There is a need, therefore, for a battery charger that provides an optimal charging current profile with respect to the charge state of the battery, yet does not apply a voltage in excess of the gassing potential. Thus, there is a need for a voltage controlled battery charger that allows for maximum charging current without causing undesirable gassing or heating. There is further a need for a battery charger that provides for improved charge acceptance of sulfated batteries. There is another need for a battery charger that provides an indication of battery capacity during the charging process so that a bad or weak battery can be identified early in such process.

SUMMARY OF THE INVENTION

The charger and method of the invention has a number of advantages over the prior art including the provision of a battery charger that substantially reduces the likelihood of gassing during the charging process by maintaining the charging signal at a level sufficiently high to efficiently charge the battery, yet sufficiently low as to prevent gassing. The invention also provides for improved charge acceptance of sulfated batteries by attempting to desulfate such batteries before charging such batteries. The charger and method advantageously monitor battery characteristics during the charging process so that a bad or weak battery may be identified in an efficient manner and removed from service.

In an exemplary embodiment, the invention includes a method for charging a battery having battery terminals. The method comprises several steps including initiating a charging process. A charging signal is applied to the battery terminals. The battery terminal voltage associated with the battery is measured. A ripple voltage component of the measured battery terminal voltage is determined. The determined ripple voltage is compared to a ripple voltage limit having a first value. The ripple voltage limit is decreased from the first value to a second value if the determined ripple voltage component is less than the first value of the ripple voltage limit. The charging process is terminated if the determined ripple voltage is greater than the ripple voltage limit.

Another embodiment of the invention includes a method for charging a battery for a charging time. The battery has battery terminals. The method comprises several steps which include initiating a battery charging process. A charging signal is applied to the battery terminals. The battery terminal voltage associated with the battery is measured. A ripple voltage component of the measured battery terminal voltage is determined. The determined ripple voltage component is compared to a ripple voltage limit having a first value. The charging process is terminated if the determined ripple voltage component is greater than the ripple voltage limit. The ripple voltage limit is adjusted as a function of the charging time such that the ripple voltage limit decreases from the first value to a second value as the charging time increases.

Another exemplary embodiment of the invention includes a battery charger for charging a battery for a charging time. The battery includes battery terminals, an electrolyte, and has a gassing potential at which the electrolyte tends to vaporize. The battery charger comprises a controller that selectively provides a power control signal. The controller includes a monitoring function that monitors a voltage at the battery terminals. A power application circuit applies a charging signal to the battery terminals in response to the power control signal. The controller includes a measuring function that selectively measures a ripple voltage associated with the voltage monitored at the battery terminals. The controller includes a ripple voltage comparing function that compares the monitored ripple voltage to a ripple voltage limit having a first value. The controller includes a limit adjusting function that adjusts the ripple voltage limit as a function of the charging time such that the ripple voltage limit decreases from the first value to a second value as the charging time increases.

In yet another exemplary embodiment, the invention comprises a method of charging a battery. The battery includes battery terminals, an electrolyte, and a predetermined gassing potential at which the electrolyte tends to vaporize. The method comprises applying a charging signal to the battery terminals. A battery terminal voltage associated with the battery is measured. The measured battery terminal voltage is compared to a voltage threshold. The applied charging signal is adjusted as a function of the measured battery terminal voltage such that the measured battery terminal voltage substantially remains below the predetermined gassing potential.

The invention also includes a method of charging a battery that includes battery terminals, an electrolyte, and a predetermined gassing potential at which the electrolyte tends to vaporize. The method comprises applying an initial charging voltage to the battery terminals. A battery terminal voltage associated with the battery is measured at the battery terminals. The measured battery terminal voltage is compared to an upper voltage threshold. The measured battery terminal voltage is compared to a lower voltage threshold. The applied charging is increased if the measured battery terminal voltage is less than the lower voltage threshold. The applied charging voltage is decreased if the measured battery terminal voltage is above the upper voltage threshold. The applied charging voltage is maintained if the measured battery terminal voltage is above the lower voltage threshold and below the upper voltage threshold, such that the measured battery terminal voltage substantially remains below the predetermined gassing potential.

In still another embodiment, the invention comprises a battery charger for charging a battery. The battery includes battery terminals, an electrolyte, and a predetermined gassing potential at which the electrolyte tends to vaporize. The battery charger comprises a controller selectively providing a power control signal. The controller includes a monitoring function that monitors a voltage at the battery terminals. A power application circuit selectively applies a charging signal to the battery terminals in response to the power control signal. The controller includes an adjusting function that adjusts the power control signal in response to the voltage monitored at the battery terminals such that the power control signal is adjusted to substantially inhibit the power application circuit from applying the charging signal at a level above the predetermined gassing potential.

In yet another exemplary form, the invention comprises a method of charging a battery having battery terminals. The method comprises initiating a battery charging process. A charging signal is applied to the battery terminals. A battery terminal voltage associated with the battery is measured. A ripple voltage component of the measured battery terminal voltage is determined. The determined ripple voltage component is compared to a ripple voltage limit having a first value. The ripple voltage limit is adjusted from the first value to a second value as a function of the difference between the determined ripple voltage component and the ripple voltage limit. A determination is made as to whether the battery is sulfated. If the battery is sulfated, a desulfation process is performed. The desulfation process comprises applying a pulse charge voltage charging profile to the battery terminals. A charge acceptance charging profile is applied to the battery terminals upon completion of the application of the pulse charge voltage charging profile.

Still another exemplary embodiment of the present invention comprises a method of charging a battery comprising battery terminals, an electrolyte, and having a gassing potential at which the electrolyte tends to vaporize. The method comprises initiating a battery charging process. A charging signal is applied to the battery terminals. A battery terminal voltage associated with the battery is measured. A ripple voltage component of the measured battery terminal voltage is determined. The determined ripple voltage component is compared to a ripple voltage limit having a first value. The ripple voltage limit is adjusted from the first value to a second value as a function of a difference between the determined ripple voltage component and the ripple voltage limit. The measured battery terminal voltage is compared to a voltage threshold. A difference between the battery terminal voltage and the voltage threshold voltage is determined. The charging signal is adjusted as a function of the difference between the battery terminal voltage and the voltage threshold such that the measured battery terminal voltage substantially remains below the gassing potential.

In still another exemplary form, the invention comprises a method of charging a battery comprising battery terminals, an electrolyte, and having a gassing potential at which the electrolyte tends to vaporize. The method comprises initiating a battery charging process. A charging voltage is applied to the battery terminals. A battery terminal voltage associated with the battery is measured. A ripple voltage component of the measured battery terminal voltage is determined. The determined ripple voltage component is compared to a ripple voltage limit having a first value. The ripple voltage limit is adjusted from the first value to the second value as a function of the difference between the determined ripple voltage component and the ripple voltage limit. The measured battery terminal voltage is compared to an upper voltage threshold. The measured battery terminal voltage is compared to a lower voltage threshold. The applied charging voltage is increased if the measured battery terminal voltage is below the lower voltage threshold. The applied charging voltage is decreased if the measured battery terminal voltage is above the upper voltage threshold.

Alternatively, the invention may comprise various other methods, devices, and/or systems.

Other objects and features will be in part apparent and in part pointed out hereinafter.

BRIEF DESCRIPTION OF THE DRAWINGS

FIG. 5 is a flow chart of a battery charging method that monitors ripple voltage on the battery terminals to assess battery capacity.

Corresponding reference characters are intended to indicate corresponding parts throughout the drawings.

DETAILED DESCRIPTION OF PREFERRED EMBODIMENTS

Figure 1:
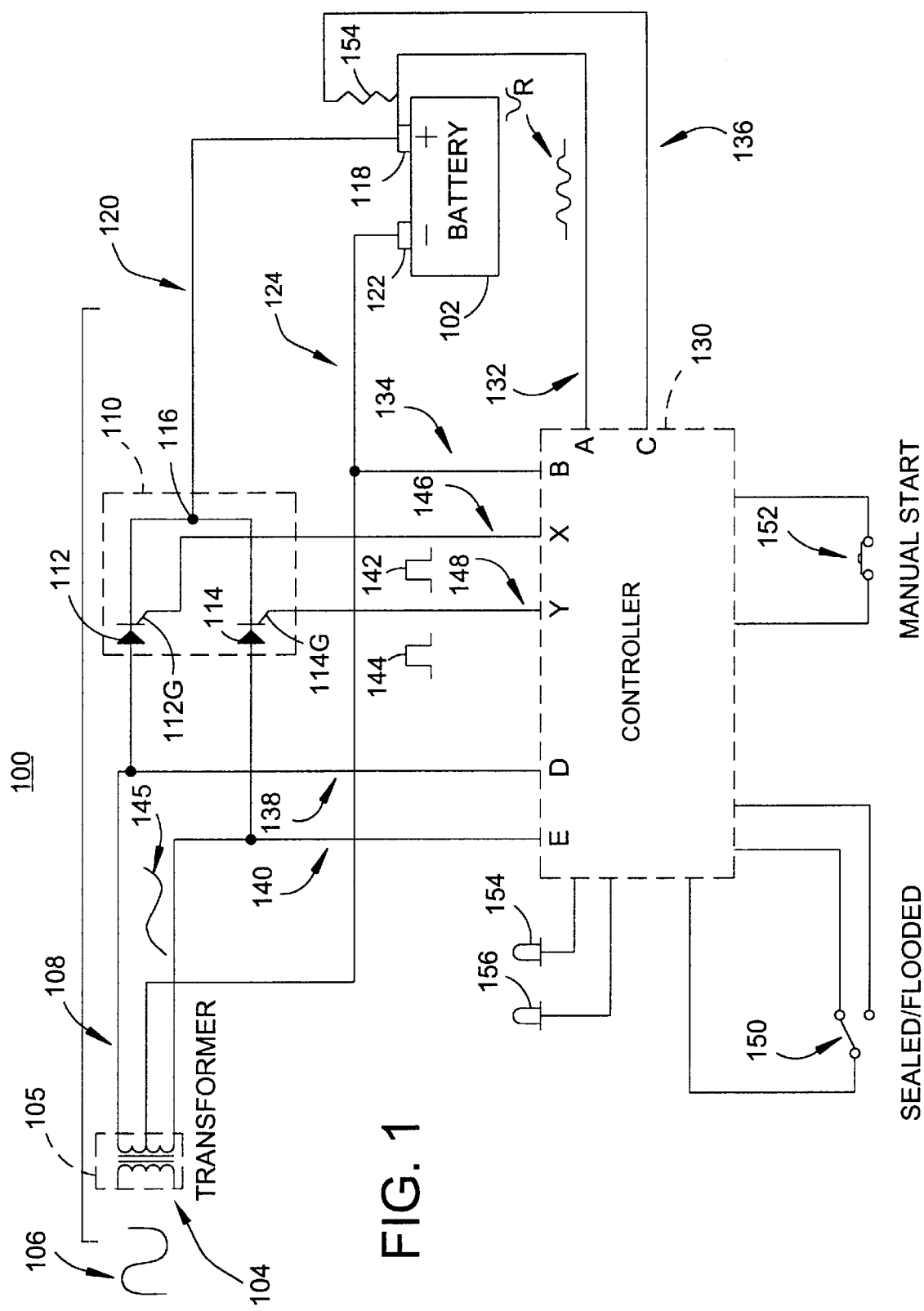
FIG. 1 is a schematic of a battery charger according to the present invention.

Referring now to the drawings, FIG. 1 is a schematic of a voltage controlled battery charger 100 for charging a battery 102 according to the present invention. As shown therein, the input side 104 of a transformer 105 is connected to an AC line source 106. The output side 108 of the transformer 105 is connected to the input of a rectifier circuit 110 that includes a pair of gated input switches 112, 114. The gated input switches 112, 114 are preferably SCRs, however, other power switching devices may be used as well. For simplicity, gated input switches 112, 114 will be hereinafter respectively referred to as SCRs 112, 114. An output 116 of the rectifier circuit 110 is connected to a positive terminal 118 of the battery 102 by a first charging cable 120. A second charging cable 124 connects negative terminal 122 of battery 102 is connected to a center tap of transformer 105. A controller 130, preferably a microprocessor or microcontroller, is connected to battery terminals 118, 122 by lines 132, 134, 136, and controller inputs A, B, C, respectively. As will be explained in greater detail, the controller 130 monitors the open circuit terminal voltage ("OCT voltage") appearing at terminals 118, 122 of battery 102 via lines 132, 134. Controller 130 calculates appropriate gating signals 142, 144 for SCRs 112, 114 based, in part, on the value of the measured OCT voltage. Gating signals 142, 144 may also be referred to as power control signals. Controller 130 also monitors a low voltage AC power source 145 appearing at the output 108 of transformer 105. Controller 130 monitors the low voltage AC power source 145 to determine when to apply the gating signals 142, 144 to SCRs 112, 114, as noted below. Controller 130 outputs gating signals 142, 144 to SCRs 112, 114 on lines 146, 148, via controller outputs X, Y. In particular, controller 130 applies gating signals 142, 144 to the respective gates 112G, 114G of SCRs 112, 114.

A user controlled battery type switch 150 is connected to and monitored by controller 130 for indicating to controller 130 the type of battery to be charged. Preferably, the battery type switch 150 is such that users may specify whether battery 102 is a sealed or conventional/flooded battery which, as explained in greater detail hereafter, can affect the charging process applied to battery 102.

Also connected to and monitored by controller 130 is a manual start switch 152. The manual start switch 152 is preferably a momentary contact switch that can be used to manually initiate the charging process, when, for example, the initial OCT voltage of battery 102 lies below a level that would otherwise permit the charging process to initiate automatically.

In the preferred embodiment illustrated in FIG. 1, a temperature sensor 154 associated with the battery clamp (not illustrated) mounted on positive terminal 118 provides the temperature of the battery clamp as an indication of the temperature of battery 102. Advantageously, controller 130 is configured to monitor the temperature of battery 102 before and/or during charging.

Controller 130 also drives a pair of status LEDs 154, 156. LED 154 preferably comprises a green LED, while LED 156 comprises a yellow LED. It is to be understood that other status/indication devices and/or combinations of LEDs are contemplated and may be used in connection with the present invention. For example, a red LED (not shown) preferably indicates when AC power is on.

In operation, transformer 105 converts the AC line source voltage 106 to low voltage AC power source 145 (also referred to as secondary AC voltage 145). The size and output voltage of transformer 105 is selected to accommodate the desired current capacity and DC voltage range of the voltage controlled charger 100. Rectifier 110 converts secondary AC voltage 145 to DC charging signals of varying levels depending upon the gating signals 142, 144 applied to SCRs 112, 114. The outputs of SCRs 112, 114 are connected to output 116 of rectifier circuit 110 which is, in turn, connected to positive battery terminal 118. Consequently, a charging voltage/signal originating from rectifier circuit 110 may be selectively applied to battery 102.

Before commencing the charging process, controller 130 conducts a reverse polarity check. Preferably, controller 130 reads the OCT voltage to determine whether a minimum positive voltage (e.g., 1 VDC) is present at terminals 118, 122. During the remainder of the charging process, controller 130 continually or periodically checks for a minimum positive voltage to ensure that the battery cables are securely attached so as to reduce the possibility of sparking.

If the OCT voltage is greater than the minimum positive voltage, the controller 130 turns on green LED 154 indicating a proper polarity connection between charger 100 and battery 102. Thereafter, controller 130 measures and stores the initial OCT voltage and, after a brief delay (e.g., 2 or 3 seconds), it turns off green LED 154 and executes an appropriate charge cycle.

If the initial OCT voltage is greater than an upper threshold, such as, for example, 11.0 VDC, controller 130 executes a normal charging process. In the embodiment depicted in FIG. 1, controller 130 turns on yellow LED 156 during the normal charging process. As part of the normal charging process, controller 130 sinks to the zero crossing point of secondary AC voltage 145, as sensed via lines 138, 140 and the controller inputs D, E. Controller 130 initially turns on SCRs 112, 114 for the maximum time period (i.e., providing a full wave rectified DC voltage to battery 102). Thereafter, at each zero crossing of secondary AC voltage 145, controller 130 measures the OCT voltage and, as will be explained in greater detail below, compares it to one or more stored values thereby determining the duration of the gate pulses 142, 144 applied to SCRs 112, 114. Preferably, the duration of each gate pulse 142, 144 is divided into a discrete number of steps (e.g., 8 or 16), wherein the maximum number of steps reflects the maximum duration of each gate pulse signal. Thus, the charging voltage/signal applied to battery 102 has a functional relationship to the number of gating steps applied.

It is also preferable that one of the stored values to which controller 130 compares the OCT voltage represents a gassing potential threshold for battery 102. For example, the gassing potential for a typical sealed lead acid battery may be 14.2 VDC. If the measured OCT voltage exceeds this gassing potential, controller 130 reduces the SCR pulse "ON" time by one step, thereby preventing or greatly reducing the chance that battery 102 will vent gas as a result of the charging process. Preferably, controller 130 repeats this check periodically with each zero crossing of secondary AC voltage 145.

If the state of charge of battery 102 is less than fifty percent, controller 130 applies a fast charging profile. During this time, however, controller 130 continues to monitor the OCT voltage and ensure that the applied voltage remains less than the gassing voltage. Those skilled in the art will also recognize that a relatively larger transformer having a greater current output capacity will provide a greater charge current than a relatively smaller transformer. If the state of charge of battery 102 exceeds fifty percent, controller 130 continues to adjust the SCR "ON" time (as discussed above) to prevent gassing yet also provide maximum current to finish the charge process. If battery 102 is properly accepting charge, controller 130 will decrease SCR gate pulses to a minimum (i.e., one step). In the embodiment shown in FIG. 1, when controller 130 decreases SCR gate pulses 142, 144 to the minimum, controller 130 also causes yellow LED 156 to blink, thereby indicating that battery 102 is nearing completion of the charging process. This may be referred to as a finish charge indication. Controller 130 terminates the normal charging process when the OCT voltage reaches an upper limit (e.g., 14.4 VDC).

Those skilled in the art will recognize that some batteries, for various reasons such as prolonged periods of discharge, will demonstrate poor charge acceptance characteristics. When charging such batteries with the normal charging process, it is possible that the OCT voltage will actually drop as the charging current increases. Advantageously, the charger of the present invention accounts for this situation. For example, if after beginning a normal charge process the OCT voltage is less than a lower target value (e.g., 13.5 VDC), controller 130 increases the SCR "ON" time by one step after each zero crossing of secondary AC voltage 145. This process continues until the measured OCT voltage reaches or exceeds the lower target value.

If the initial battery voltage is below 11.0 VDC for a conventional (i.e., flooded, not sealed) batteries, controller 130 first attempts to desulfate the battery before beginning a normal charging process. As explained below, in the desulfation process, controller 130 causes relative large voltage pulses to be applied to battery 102. Such high voltage pulses may damage sealed batteries. Therefore, controller 130 monitors battery type switch 150 to determine whether a desulfation charging process is appropriate for the particular battery 102 to be charged. Advantageously, battery type switch 150 can also be used to permit overcharging conventional flooded batteries by allowing higher voltage limits during the normal charging process than those used for sealed batteries.

In the desulfation process, controller 130 preferably gates SCRs 112, 114 in such a manner as to cause a sequence of high voltage pulses followed by a short rest time between pulses. During this time, the green and yellow LEDs 154, 156 alternatively turn off and on. Thereafter, controller 130 causes SCRs 112, 114 to apply the maximum voltage for a short time period. Due to the typically poor charge acceptance of sulfated batteries, very little current is used during the desulfation process. Further, during this desulfation process, controller 130 also monitors the OCT voltage of battery 102 to determine whether battery 102 can be recovered. If controller 130 determines that battery 102 cannot be recovered, it terminates the charging process and indicates a bad battery. If, however, the desulfation process is successful, controller 130 then executes a normal charging process as described above.

It should also be understood that some battery manufacturers require gassing of flooded batteries while charging because it is believed that the gas produced thereby agitates the electrolyte and reduces stratification. Advantageously, controller 130 can be programmed to use voltage limits greater than the gassing potential. The amount of desired overcharge can be controlled by selecting appropriate upper voltage limits in excess of the gassing potential.

Referring still to FIG. 1, controller 130 preferably measures the temperature of battery 102 using the temperature sensor 154 located in the battery clamp associated with positive terminal 118. With this temperature information, controller 130 can adjust the charging current to compensate for temperature. Temperature compensation provides advantages because, for example, it is known that temperature affects a battery's discharge current capacity and charging current capacity. Thus, it is advantageous to monitor temperature and adjust the charging current accordingly.

As can be appreciated from the foregoing discussion associated with voltage controlled battery charger 100 illustrated in FIG. 1, initially, the amount of charging current supplied is limited only by the capacity of the charger. While charging, controller 130 monitors the OCT voltage to determine the state of charge of the battery. As the voltage approaches the gassing voltage, controller 130 adjusts gating signals 142, 144 such that the applied voltage decreases. Charging at or near the gassing voltage provides the maximum current to battery 102 without causing damage to it. Because low voltage AC source 145 typically runs at 60 Hz and controller 130 measures the OCT voltage at each zero crossing of AC source 145, the charging voltage is adjusted roughly every eight milliseconds.

Further, if the initial measured battery voltage falls below a lower threshold (e.g., 11 VDC), controller 130 first attempts to desulfate the battery, and thereby enhance charge acceptance, before attempting to fully charge the battery in the voltage controlled mode discussed above. Advantageously, voltage controlled battery charger 100 prevents damage that might otherwise occur to sealed, Gell Cell, valve regulated, and similar batteries by allowing the operator to bypass the desulfation check and process when charging one of these batteries.

Figure 1A:
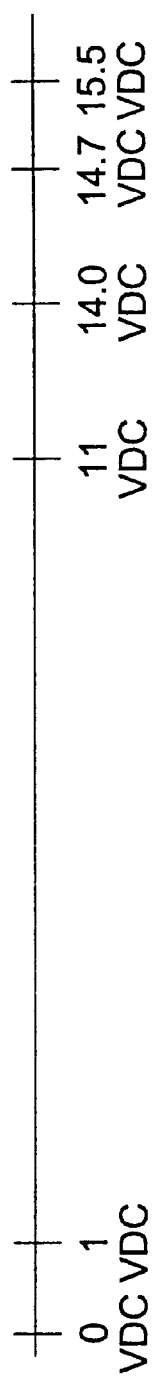
FIG. 1A is a graph illustrative of several suitable threshold voltages associated with the battery charger of FIG. 1 when used to charge a sealed battery.

FIG. 1A is a graph illustrating several threshold voltages suitable for use with battery charger 100. It should be noted that the threshold voltages shown in FIG. 1A relate to a conventional/flooded battery charging method and that other threshold values may be selected. Referring to FIGS. 1 and 1A, as illustrated therein, a polarity/anti-sparking threshold is established at 1 VDC. Controller 130 ensures that a minimum positive voltage (1 VDC) is present at terminals 118, 122 of battery 102. A desulfation threshold is set at 11 VDC. If the initial battery terminal voltage is less than 11 VDC, controller 130 attempts to desulfate the battery before executing a normal charging process. A lower charging threshold is set at 14.0 VDC. As explained in greater detail below, if, after commencing a normal charging process, the measured OCT voltage drops below 14.0 VDC, controller 130 increases the duration of the gating signals applied to SCRs 112, 114. As such, more charge is applied to battery 102. An upper charging threshold (anti-gassing threshold) is set at 14.7 VDC. If, after commencing a normal charging process, the measured OCT voltage exceeds 14.7 VDC, controller 130 decreases the duration of the gating signals applied to SCRs 112, 114. By decreasing the duration of the gating signals, less charge is applied to battery 102 and gassing of the electrolyte is avoided and/or reduced. A finish charge threshold is set at 15.5 VDC. When the minimum duration gating signal is applied to SCRs 112, 114, controller 130 terminates the charging process when the measured OCT voltage meets or exceeds 15.5 VDC.

Referring again to FIG. 1, controller 130 is preferably configured to monitor a ripple voltage $v_R$ appearing at battery terminals 118, 122 during the charging process. As described below, the amount of ripple voltage appearing at terminals 118, 122 during the charging process is indicative of the capacity of battery 102. As a result, controller 130 may control and vary the application of the charging signals applied to battery terminals 118, 122 as a function of the monitored ripple voltage.

The voltage applied to terminal 118 by SCRs 112, 114 is typically a full wave rectified voltage having peaks. Battery 102 acts as a capacitor, smoothing out the decay between the peaks in the full wave rectified voltage applied to battery 102. A battery with a low capacity provides very little filtering. Accordingly, low capacity batteries have a relatively large ripple voltage appearing at the battery terminals.

At the beginning of the charging process, a deeply discharged battery will typically have very little capacity and exhibit a relatively large ripple voltage. A good battery will rapidly increase in capacity in a short period of time—the ripple voltage will decrease as charging progresses. A poor or highly sulfated battery, on the other hand, will continue to exhibit a large ripple voltage. Therefore, by monitoring ripple voltage $v_R$ at least periodically during the charging process controller 130 can assess whether battery 102 is serviceable.

At the end of the charge, SCRs 112, 114 are typically turned full on. At this point in the charging process, the ripple voltage tolerance is preferably stringent because battery 102 should be at or near full capacity. If ripple voltage $v_R$ exceeds the stringent test during the end of charge, the battery may be declared unserviceable and removed from service.

Ripple voltage $v_R$ is preferably measured as the difference between the peak voltage and zero crossing voltage during a predefined measurement period. Table I identifies representative, exemplary values of $v_R$ for different battery types. Preferred exemplary values are shown in Table I without parentheses; the exemplary values displayed in parentheses reflect one set of possible alternative values. It should be understood that these representative values are not to be construed in a limiting sense. Moreover, the ripple voltage may be monitored a different number of times and for varying times without detracting from the present invention.

TABLE I

| Time | Sealed | Flooded | Sulfated |
|---|---|---|---|
| Time 1 | 3.0 V (2.5 V) | 3.0 V (2.5 V) | 4.0 V |
| Time 2 | 2.5 V (2.3 V) | 2.5 V (2.3 V) | 3.0 V |
| Time 3 | 2.3 V (2.0 V) | 2.3 V (2.0 V) | 2.0 V |
| End of Charge | 1.5 V | 1.5 V | 1.8 V |

As shown in Table I, at earlier stages in the charging process, larger values of ripple voltage $v_R$ are tolerated. As the charging process progresses, the amount of tolerable ripple decreases. Also, if a battery is charged using the sulfated battery charging process, relatively larger ripple voltages are tolerated. It should be noted that, depending upon battery type, Times 1, 2, and 3 may not be the same. For example, in the preferred embodiment reflect in Table I, the testing times for sulfated batteries is not the same as for flooded and sealed batteries.

Advantageously, by monitoring the condition of the battery while it is being charged, no charge is lost to load testing and surface charge does not affect the measurements. Surface charge typically occurs as a battery is charged due to an electrical potential build up on the surface of the plates due to a high concentration of ions. When charging is interrupted, it takes time to distribute the ions throughout the electrolyte. Thus, the terminal voltage stays higher than the actual state of charge of the battery would otherwise dictate. This surface charge interferes with most methods of battery testing. In order to accommodate the problem of surface charge, some testers will put a load on the battery before testing in order to bleed off the charge. Other testers require waiting several minutes after charging before testing the battery. It actually takes about 24 hours for the electrolyte to reach equilibrium.

Hence, it should be appreciated that the present charger provides considerable advantages over prior art chargers and testers in that surface charge does not affect the measurements. Moreover, the ripple voltage tolerance criteria may be set so that useless charging of a bad battery is eliminated and that unserviceable batteries are efficiently removed from service.

Figure 2A:
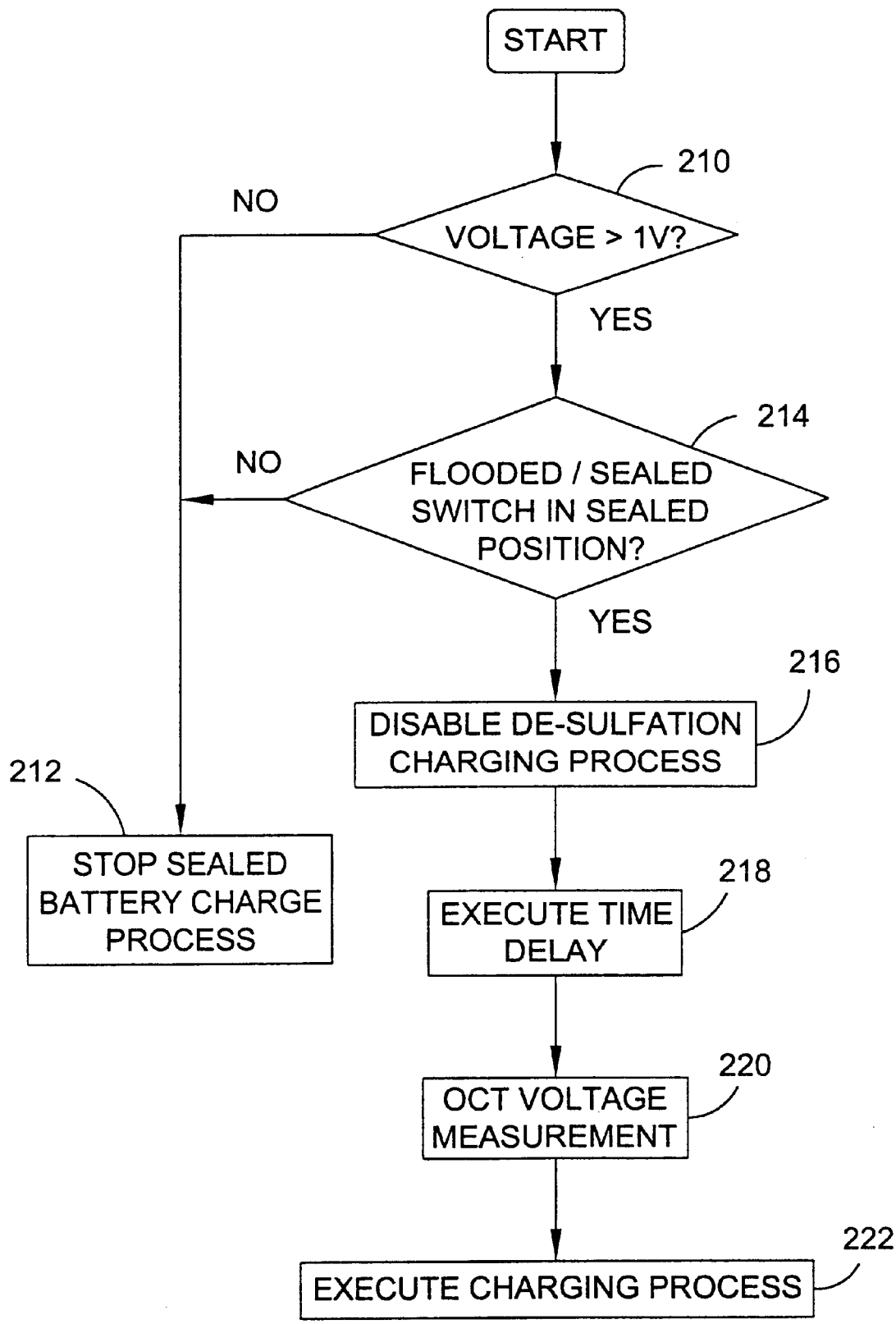
FIG. 2A is a flow chart of a battery charging method according to the present invention for use with a sealed battery.
Figure 2B:
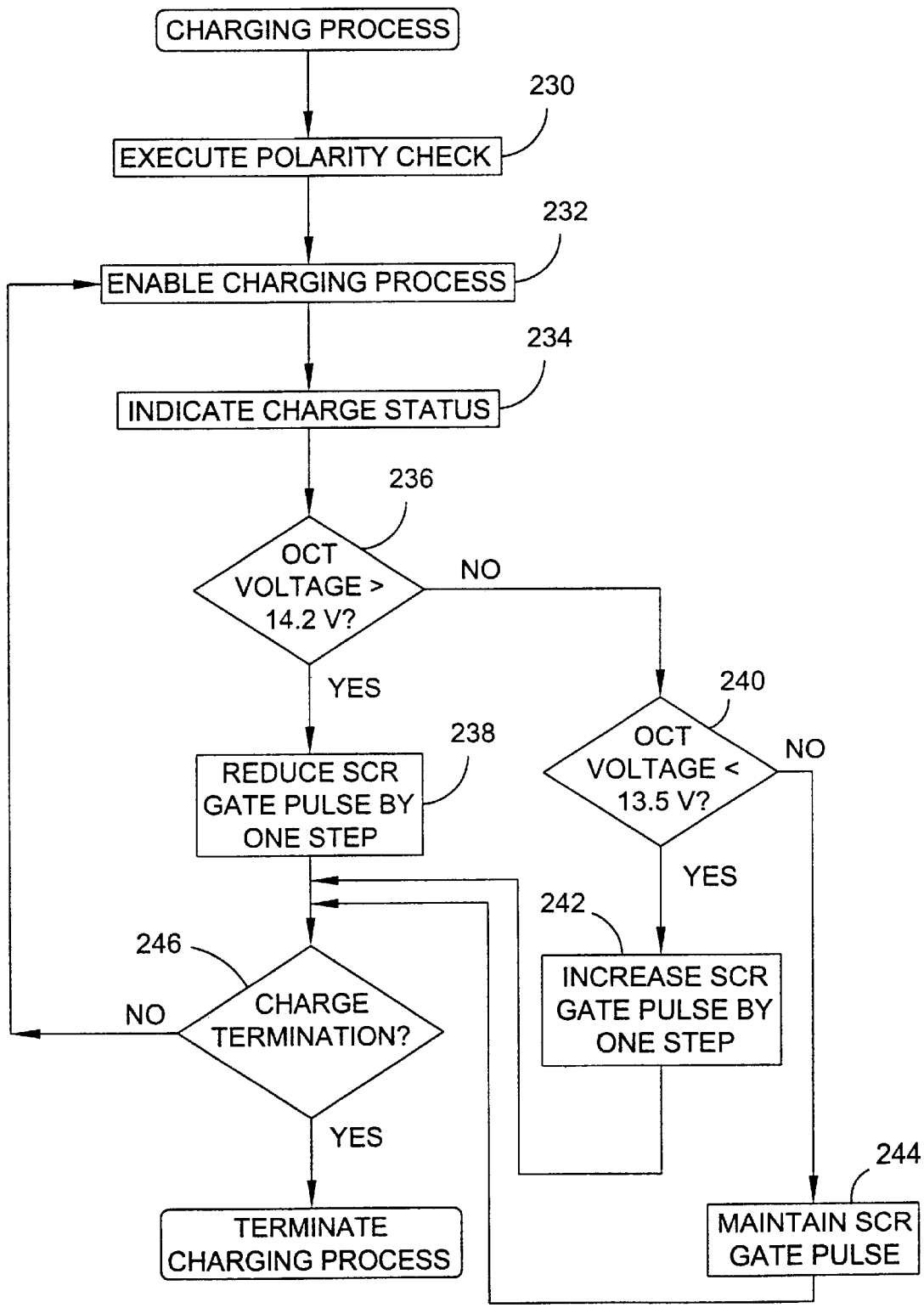
FIG. 2B is a flow chart of a charging process suitable for use with the battery charging method of FIG. 2A.
Figure 2C:
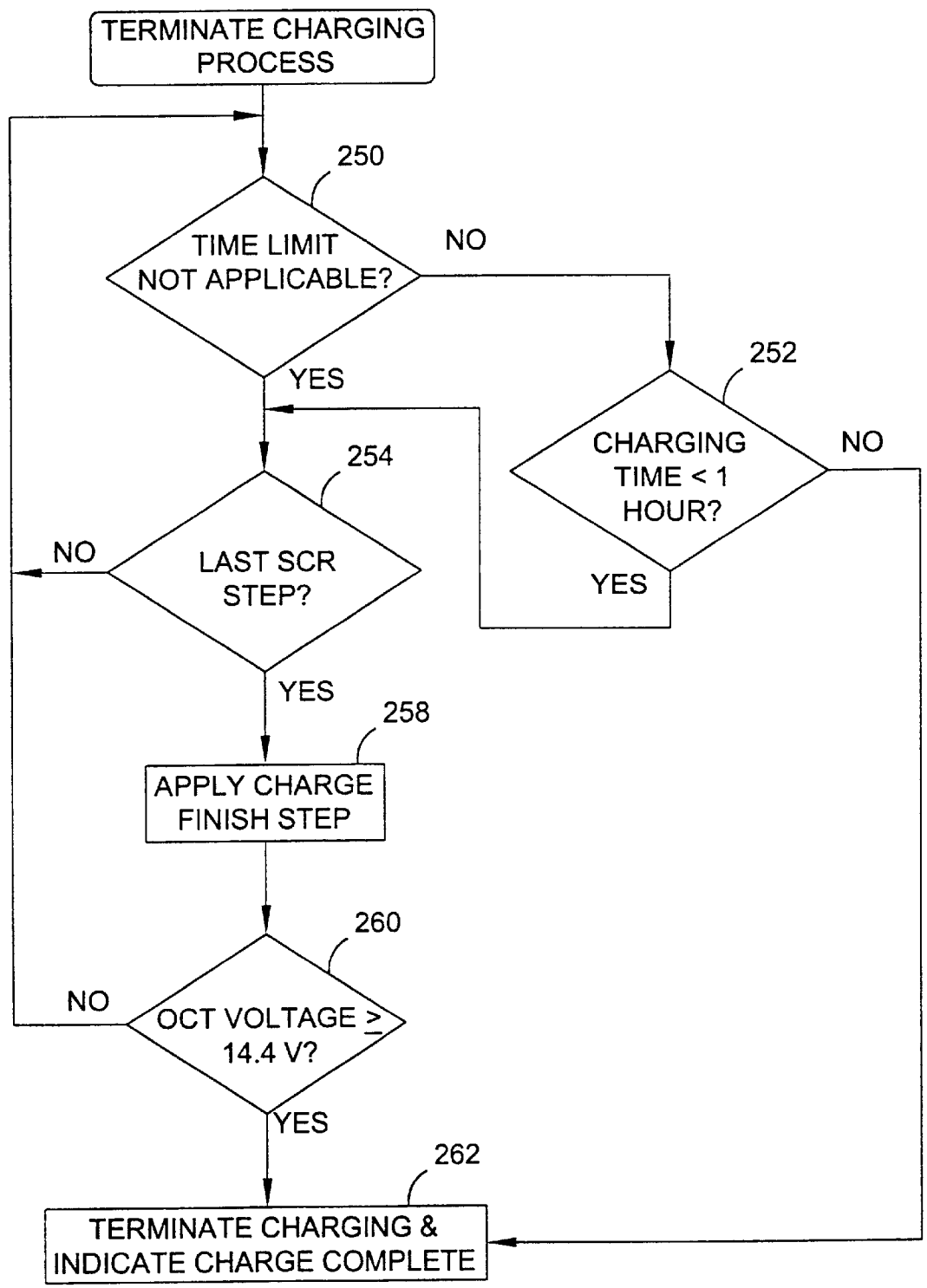
FIG. 2C is a flow chart of a charge termination process for use with the charging process of FIG. 2B.

FIGS. 2A–2C are flow charts depicting a battery charging method for use with voltage controlled battery charger 100 (FIG. 1) for charging a sealed battery without exceeding the battery's gassing potential. As shown at step 210 in FIG. 2A, the charger initially conducts a reverse polarity check by comparing the OCT voltage to a threshold positive value, preferably 1 VDC. If the initial OCT voltage is less than 1 VDC, the charger proceeds to step 212 and terminates the charge process. If, however, the initial OCT voltage is greater than 1 VDC, the charging process continues.

Decision step 214 involves a test to determine whether battery type switch 150 (FIG. 1) is in the sealed or flooded position. As discussed above, it is desirable to disable desulfation charging when charging sealed batteries. If battery type switch 150 is in the flooded position, the charger uses a charging method optimized for flooded batteries. Therefore, the process shown in FIG. 2A indicates that when battery type switch 150 is not in the sealed position, the sealed battery charging process terminates at step 212. It should be understood, however, that if battery type switch 150 were in the flooded position, all processes would not necessarily terminate, but rather the charger would execute a method for charging a flooded battery (see FIGS. 3A–3C).

Referring still to FIG. 2A, if battery type switch 150 indicates that the battery to be charged is a sealed battery, the battery charger disables the desulfation charging process at step 216. Before applying a charging voltage to battery 102 (FIG. 1), it is preferable to execute a brief time delay at step 218 (e.g., 2 seconds) after the time that battery 102 is connected to the charger and the reverse polarity check at step 210. At step 220, the charger applies power to the battery via rectifier circuit 110 (FIG. 1) and takes an OCT voltage measurement associated with the zero crossing of low voltage AC power source 145 (FIG. 1). After measuring the zero crossing OCT voltage, the charger turns on the rectifier for the remaining half cycle time period and begins the charging process at step 222.

FIG. 2B is a flow chart of a specific charging process 222 suitable for use with the battery charging method of FIG. 2A. At step 230, the charger executes a polarity check similar to the polarity check at step 210 of FIG. 2A. Such a check ensures that the cables remain securely attached to the battery and, as such, reduces the risk of sparking. It should be noted that a polarity check is preferably conducted periodically throughout the charging process. When the charging process is enabled (see step 232) and rectifier circuit 110 is turned on, yellow LED 156 (FIG. 1) is illuminated at step 234 to indicate charge status.

As discussed above, the charger preferably measures the OCT voltage at each zero crossing of low voltage AC power source 145. At step 236, the charger compares the measured OCT voltage to a gassing potential threshold (more descriptively referred to as an anti-gassing threshold) associated with the sealed battery to be charged (e.g., 14.2 VDC). If the most recent OCT voltage measurement exceeds the gassing threshold voltage, the charger reduces the gate pulse supplied to rectifier circuit 110 by one step. If the most recent OCT voltage measurement does not exceed the gassing potential threshold voltage, the charger determines at step 240 whether the gate pulse supplied to rectifier circuit 110 should be increased by a step or maintained at the same number of steps. As shown in FIG. 2B, if the most recent OCT voltage measurement falls below a lower threshold (e.g., 13.5 VDC)—indicating, for example, a battery with poor charge acceptance characteristics—the length of the gate pulse applied to rectifier circuit 110 is increased by a step at flow chart step 242. On the other hand, as indicated at step 244, if the OCT voltage measurement falls between the gassing potential threshold and the lower threshold, the charger neither increases nor decreases the number of gate pulse steps.

The number of gate pulse steps may be varied, and the number of increments possible depends, in part, on the processing speed of controller 130 (FIG. 1). In the embodiment illustrated by FIGS. 1, 2A, and 2B, at least eight steps are required, but a greater number of steps, e.g., sixteen, is preferred.

At decision step 246, a determination is made whether to continue or terminate the charging process based on whether the present charge process has exceeded a predetermined time limit or the battery is fully charged (see FIG. 2C). If it is decided to continue the charging process, the process returns to step 232 and repeats.

FIG. 2C is a flow chart of a charge termination process for use with the charging process of FIG. 2B. In particular, FIG. 2C illustrates the steps associated with the determination of whether to terminate the charging process. Decision step 250 reflects the fact that a time limit is desirable in some charging applications. If the particular charger uses a time limit (e.g., one hour), the method proceeds to step 252 and determines whether that time limit has expired. A one hour charging time limit is useful for fast chargers where a full finish charge is not desired. With smaller chargers, for example chargers with 10 to 20 amp capabilities, such a time limit is not preferred. If the time limit has expired, the charge process proceeds to step 262 and terminates. If, on the other hand, the time limit has not yet expired, or the charger does not use a time limit, the process continues to decision step 254 where the number of gate pulse steps remaining is evaluated.

If the charger has proceeded to the final gate pulse step, the charger applies a finish charge at step 258. The finish charge process associated with sealed batteries involves continuing to apply a single step gate pulse each cycle until the OCT voltage reaches a final level (e.g., 14.4 VDC) as shown at step 260. When the OCT voltage reaches the final value, the charging process proceeds to step 262, terminates, and indicates that the charge is complete.

Figure 3A:
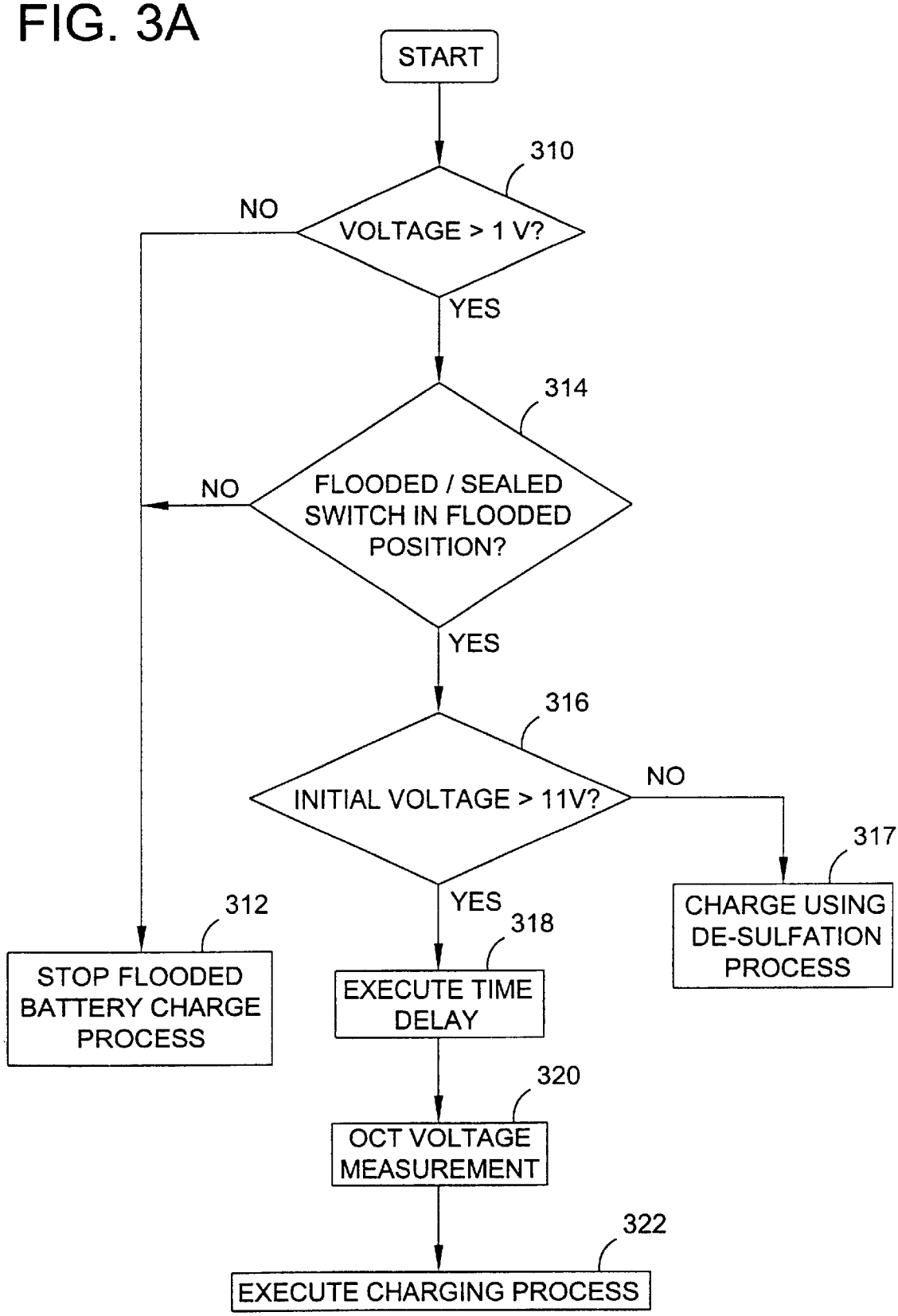
FIG. 3A is a flow chart of a battery charging method according to the present invention for use with a flooded battery.
Figure 3B:
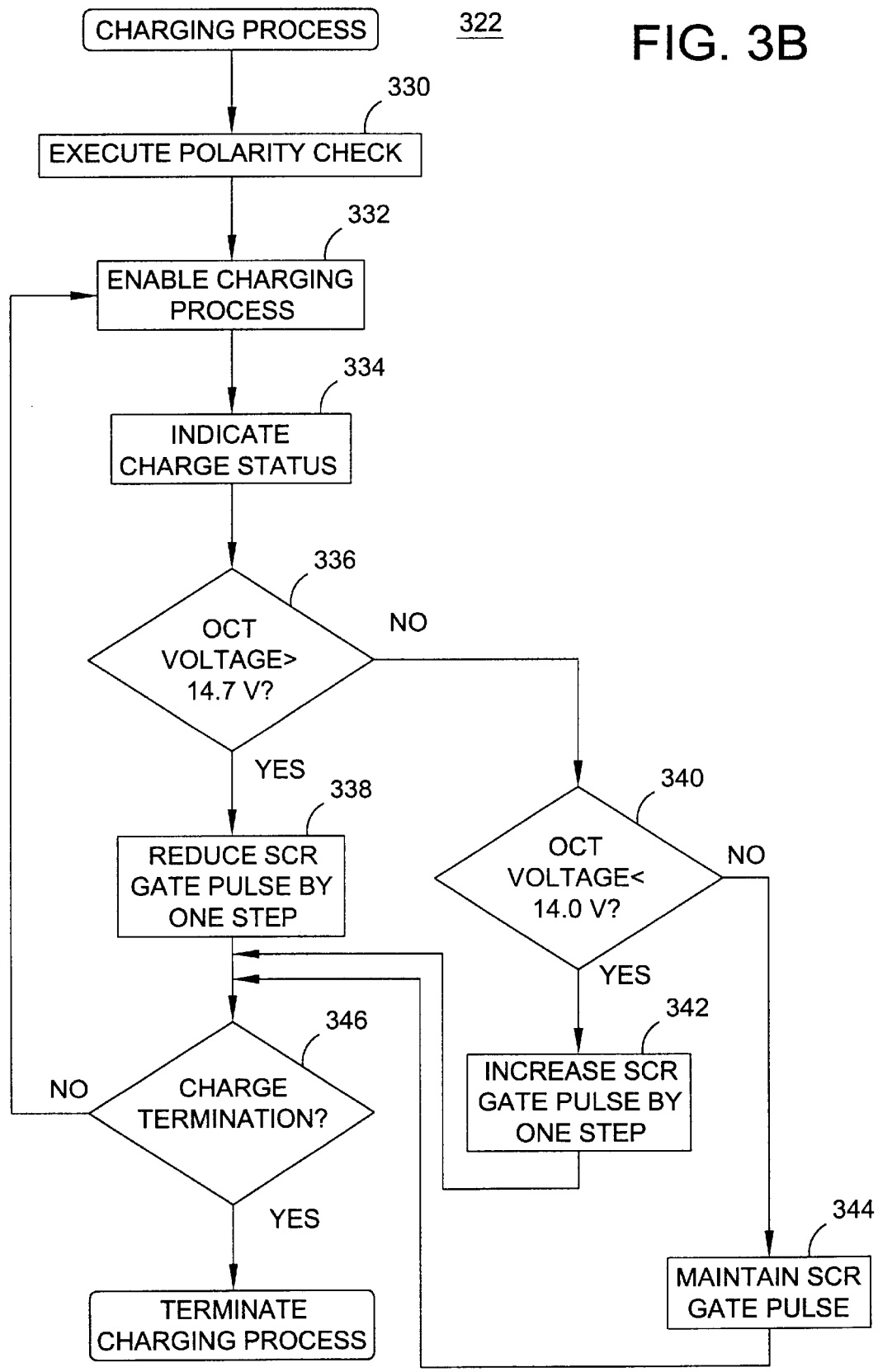
FIG. 3B is a flow chart of a charging process suitable for use with the battery charging method of FIG. 3A.
Figure 3C:
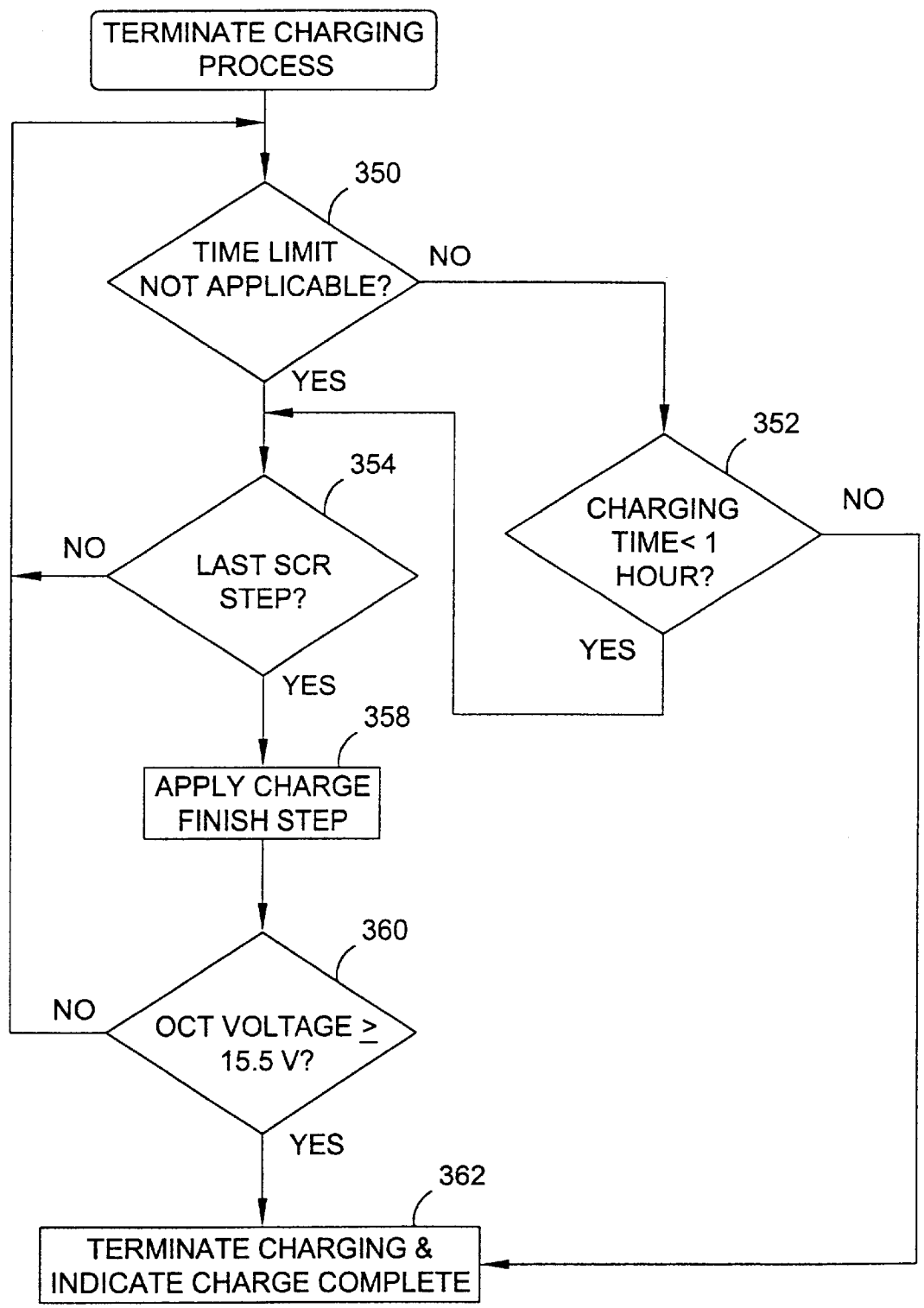
FIG. 3C is a flow chart of a charge termination process for use with the charging process of FIG. 3B.

FIGS. 3A–3C are flow charts of a battery charging method for use with battery charger 100 (FIG. 1) for charging a conventional/flooded battery without exceeding the battery's gassing potential. As shown at step 310 of FIG. 3A, the charger initially conducts a reverse polarity check by comparing the OCT voltage to a threshold positive value, preferably 1 VDC. If the initial OCT voltage is less than this threshold positive value, the charger proceeds to step 312 and terminates the charging process. If, on the other hand, the initial OCT voltage is greater than 1 VDC, the charging process continues.

Referring still to FIG. 3A, decision step 314 reflects a test for determining whether battery type switch 150 (FIG. 1) is in the sealed or flooded position. As already discussed, it is generally not desirable to use desulfation charging (as that term is used herein) when charging sealed batteries. Thus, if battery type switch 150 is in the sealed position, the charger uses a charging process optimized for sealed batteries (see FIGS. 2A–2C and associated discussion above). Therefore, the process shown in FIG. 3A indicates that when battery type switch 150 indicates a sealed battery, the flooded battery charging process terminates at step 312. It should be understood, however, that if battery type switch 150 were in the sealed position, all processes would not necessarily terminate, but rather the charger would execute a process for charging a sealed battery (FIGS. 2A–2C).

As illustrated in FIG. 3A, if battery type switch 150 indicates a flooded battery, the battery charger proceeds to step 316 to determine whether desulfation is desired. In particular, if the initial OCT voltage measured before any attempt at charging is less than a desulfation threshold (e.g., 11 VDC), the charger attempts to desulfate the battery before executing a normal charging process, as reflected at step 317 (see also FIGS. 4A–4D and associated discussion below). If, however, the initial OCT voltage is greater than the desulfation threshold (e.g., greater than 11 VDC), the charger proceeds a normal charging process optimized for conventional/flooded batteries.

As shown at step 318, during the normal charging process it is preferable to execute a brief (e.g., 2 second) time delay after the time that battery 102 is connected to the charger and the reverse polarity check is conducted at step 310. After the time delay, at step 320 the charger applies power to the battery via rectifier circuit 110 (FIG. 1) and takes an OCT voltage measurement associated with the zero crossing of low voltage AC power source 145. It should be noted that one advantage measuring OCT voltage at the zero crossing point is that at that moment, no voltage is applied to the battery terminals. At step 322, after measuring the zero crossing OCT voltage, the charger turns on the rectifier for the remaining half cycle time period and begins the full charging process.

FIG. 3B is a flow chart of a specific charging process 322 suitable for use with the battery charging method of FIG. 3A. At step 330, the charger executes a polarity check similar to the polarity check at step 310 of FIG. 3A. Such a check ensures that the cables remain securely attached to the battery. It should be noted that polarity is preferably checked periodically throughout the charging process. When the charging process is enabled (see step 332) and rectifier circuit 110 is turned on, yellow LED 156 (FIG. 1) is illuminated at step 334 to indicate charge status.

As discussed above, the charger preferably measures the OCT voltage at each zero crossing of low voltage AC power source 145. At step 336, the charger compares the measured OCT voltage to a gassing potential threshold associated with the conventional/flooded battery to be charged (e.g., 14.7 VDC). If the most recent OCT voltage measurement exceeds the anti-gassing threshold voltage, the charger reduces the gate pulse supplied to rectifier circuit 110 by one step. If the most recent OCT voltage measurement does not exceed the anti-gassing potential threshold voltage, the charger determines at step 340 whether the gate pulse supplied to rectifier circuit 110 should be increased by a step or maintained at the same number of steps. As shown in FIG. 3B, if the most recent OCT voltage measurement falls below a lower threshold (e.g., 14.0V)—indicating, for example, a battery with poor charge acceptance characteristics—the length of the gate pulse applied to rectifier circuit 110 is increased by a step at step 342. On the other hand, as indicated at step 344, if the OCT voltage measurement falls between the gassing potential threshold and the lower threshold, the charger neither increases nor decreases the number of gate pulse steps.

The number of gate pulse steps may be varied, and the number of increments possible depends, in part, on the processing speed of controller 130. In the embodiment illustrated by FIGS. 1, 3A, and 3B, at least eight steps are required, but a greater number of steps, e.g., sixteen, is preferred.

At decision step 346, a determination is made whether to continue or terminate the charging process based on whether the present charge process has exceeded a predetermined time limit or the battery is fully charged (see FIG. 3C). If it is decided to continue the charging process, the process returns to step 332 and repeats.

FIG. 3C is a flow chart of a charge termination process for use with the charging process of FIG. 3B. In particular, FIG. 3C illustrates the steps associated with the determination of whether to terminate the charging process. Decision step 350 reflects the fact that a time limit is desirable in some charging applications. If the particular charger uses a time limit (e.g., one hour), the method proceeds to step 352 and determines whether the time limit has expired. If the time limit has expired, the charger proceeds to step 362 and terminates the process. If, on the other hand, the time limit has not yet expired, or the charger does not use a time limit, the process continues to decision step 354 where the number of gate pulse steps remaining is evaluated.

If the charger has proceeded to the final gate pulse step, the charger applies a finish charge at step 358. The finish charge process associated with conventional/flooded batteries involves a pulsing process wherein SCRs 112, 114 (FIG. 1) are turned full on for a brief time (e.g., one second) followed by a brief rest time (e.g., 1 second). The finish charge step continues until the measured OCT voltage reaches a final value (e.g., 15.5 VDC), as reflected at decision step 360. When the OCT voltage reaches the final value the charging process proceeds to step 362, terminates, and indicates that the charge is complete.

Figure 4A:
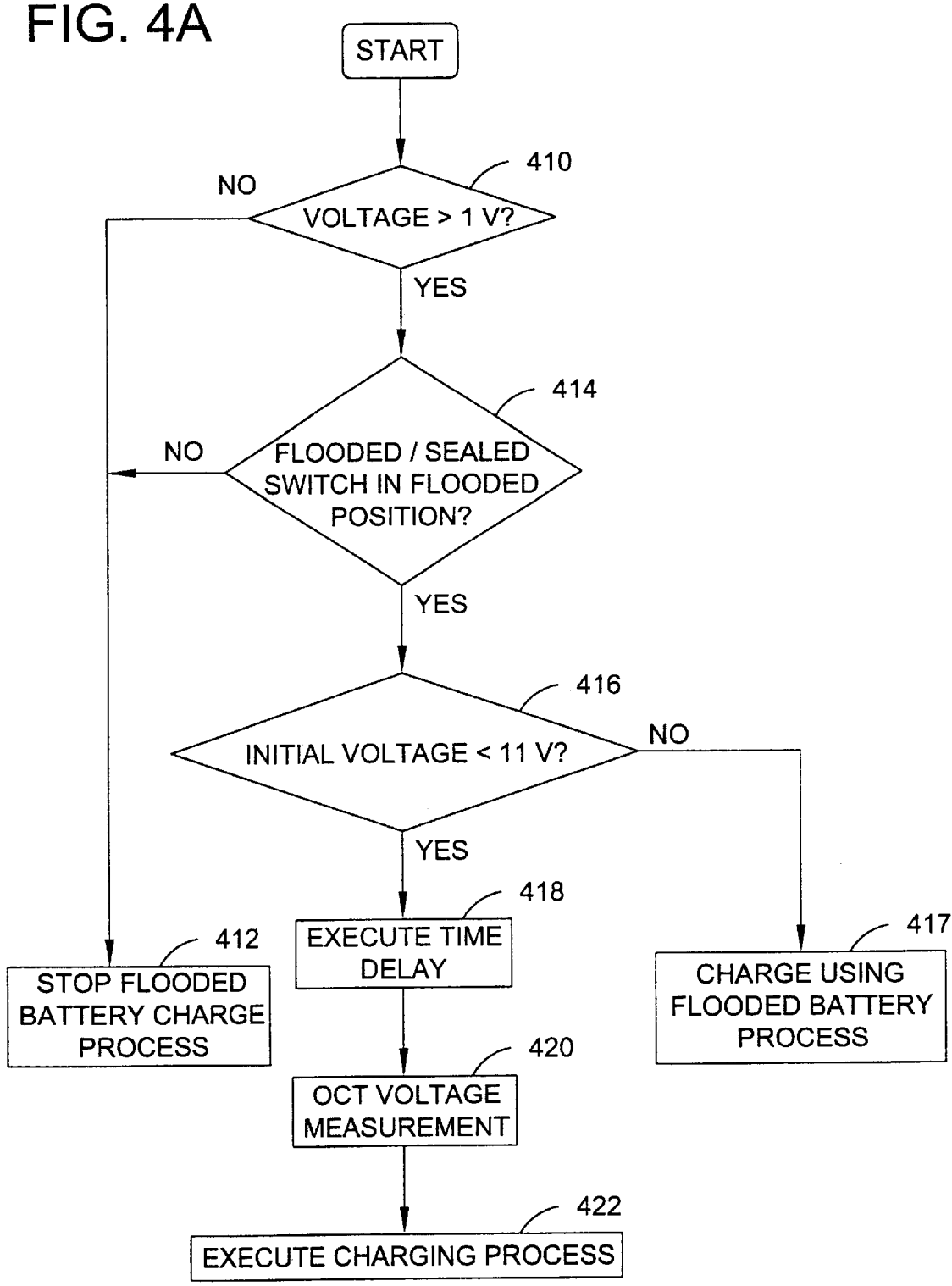
FIG. 4A is a flow chart of a battery charging method according to the present invention for use in charging a sulfated battery.
Figure 4B:
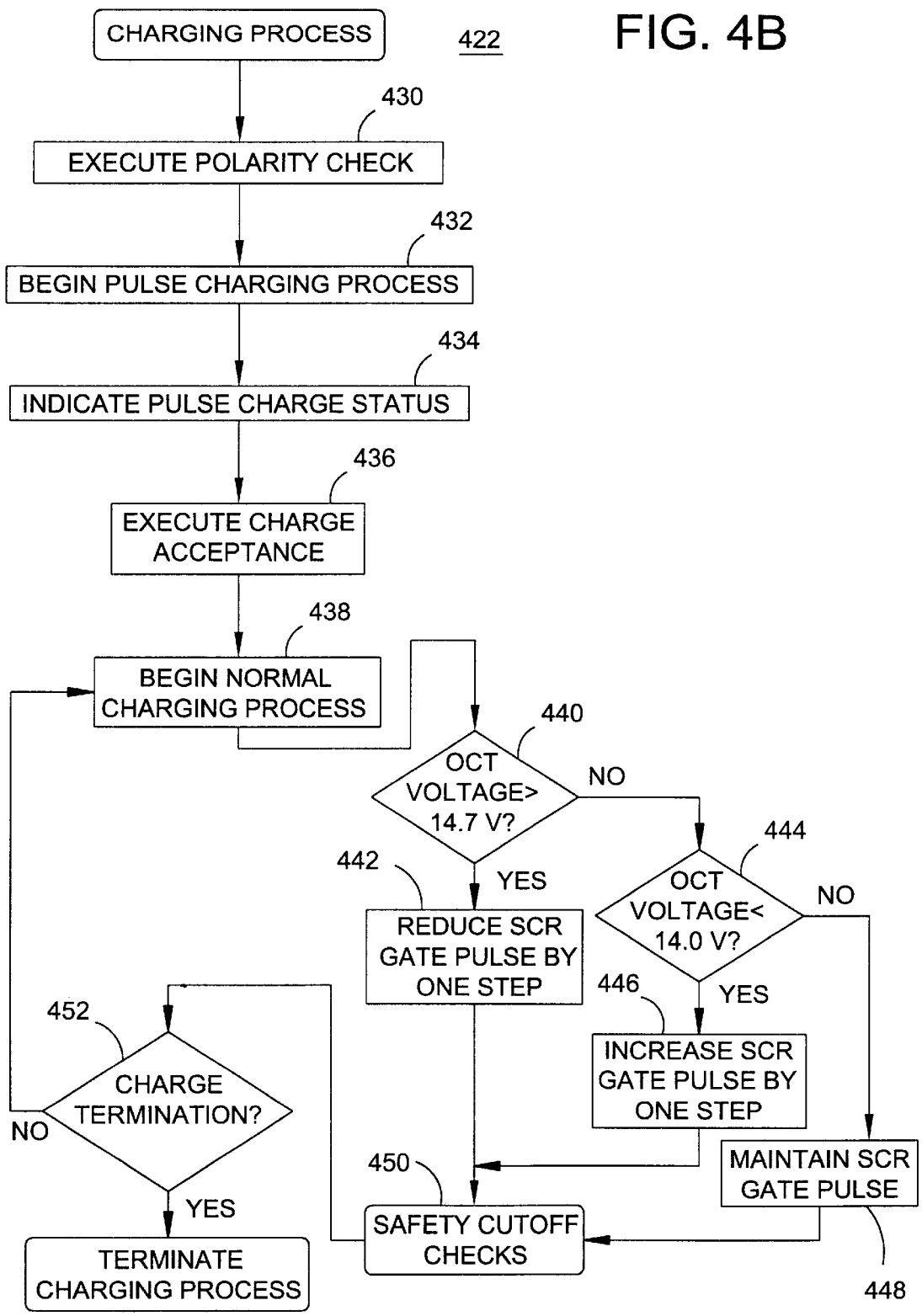
FIG. 4B is a flow chart of a charging process suitable for use with the battery charging method of FIG. 4A.
Figure 4C:
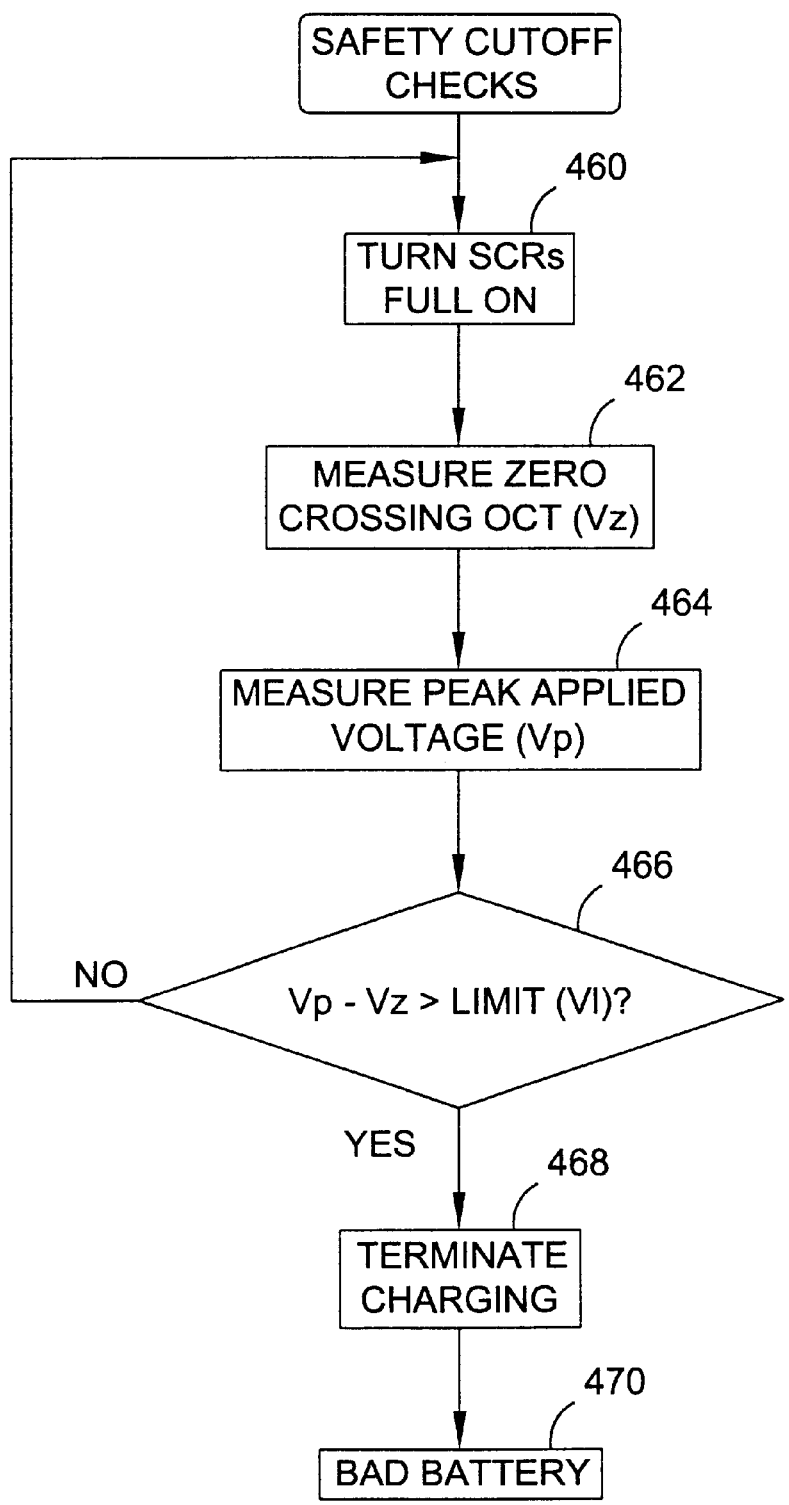
FIG. 4C is a flow chart of a safety cut-off process suitable for use with the battery charging process of FIG. 4B.

FIGS. 4A–4C are a series of flow charts illustrative of a charging method for charging a sulfated battery. Generally speaking, the sulfated battery charging method is similar to the process for charging a flooded battery (FIGS. 3A–3C) with a few exceptions, such as, for example, the addition of several steps for desulfating the battery and additional safety cut-off steps.

As shown at step 410 of FIG. 4A, the charger initially conducts a reverse polarity check by comparing the OCT voltage to a threshold positive value, preferably 1 VDC. If the initial OCT voltage is less than this threshold positive value, the charger proceeds to step 412 and terminates the charging process. If, on the other hand, the initial OCT voltage is greater than 1 VDC, the charging process continues.

Referring still to FIG. 4A, decision step 414 reflects a test for determining whether battery type switch 150 (FIG. 1) is in the sealed or flooded position. As discussed above, it is generally not desirable to attempt to desulfate sealed batteries. Thus, if battery type switch 150 is in the sealed position, the charger uses a charging process optimized for sealed batteries (see FIGS. 2A–2C and associated discussion above). Accordingly, the method shown in FIG. 4A indicates that when battery type switch 150 indicates a sealed battery, the flooded battery charging process terminates at step 412. It should be understood, however, that if battery type switch 150 were in the sealed position, all processes would not necessarily terminate, but rather the charger would execute a process for charging a sealed battery (FIGS. 2A–2C).

As shown in FIG. 4A, if battery type switch 150 indicates a flooded battery, the battery charger proceeds to step 416 to determine whether desulfation is desired. In particular, if the initial OCT voltage measured before any attempt at charging is less than a desulfation threshold (e.g., 11 VDC), the charger attempts to desulfate the battery, as reflected at step 417. If, however, the initial OCT voltage is greater than the desulfation threshold (e.g., greater than 11 VDC), the charger proceeds a normal charging process optimized for conventional/flooded batteries.

As illustrated at step 418, during the charging process used with sulfated batteries it is preferable to execute a brief (e.g., 2 second) time delay after the time that battery 102 is connected to the charger and the reverse polarity check is conducted at step 410. After the time delay, at step 420 the charger applies power to the battery via rectifier circuit 110 (FIG. 1) and takes an OCT voltage measurement associated with the zero crossing of low voltage AC power source 145. At step 422, after measuring the zero crossing OCT voltage, the charger turns on the rectifier for the remaining half cycle time period and beings the full charging process.

FIG. 4B is a flow chart of a specific charging process 422 suitable for use with the battery charging method of FIG. 4A. At step 430, the charger executes a polarity check similar to the polarity check at step 410 if FIG. 4A. Such a check ensures that the cables remain securely attached to the battery. It should be noted that polarity is preferably checked periodically throughout the charging process.

The desulfation charging process begins with a series of pulse charges, as indicated at step 432. In a preferred embodiment, the pulse charging involves turning the rectifier (see SCRs 112, 114 in FIG. 1) full on for one second followed by a one second off period, and repeating this cycle for approximately one minute. During this pulse charging cycle, when the SCRs are on, yellow LED 156 is illuminated; when the SCRs are off, green LED 154 is illuminated (see step 434).

After pulse charging the battery, the charger conducts a charge acceptance period at step 436. The charge acceptance period preferably comprises a brief rest period (e.g., two seconds), followed by a longer period (e.g., four minutes) during which the SCRs are turned full on. During this period, yellow LED 156 is illuminated.

At the completion of the acceptance period, the charger enters a normal charging process at step 438 during which there is another brief rest period (e.g., two seconds). After this rest period, the charger reads the OCT voltage and turns on the SCRs for the remaining half cycle time period.

Thereafter, the gate pulse width applied to the SCRs is adjusted (relative to the previous gate pulse width) according to the most recent OCT voltage measurement. At step 440, the charger compares the measured OCT voltage to a gassing potential associated with the battery to be charged (e.g., 14.7 VDC). If the most recent OCT voltage measurement exceeds the threshold voltage, the charger reduces the gate pulse supplied to rectifier circuit 110 by one step. If the most recent OCT voltage measurement does not exceed the gassing potential threshold voltage, the charger determines at step 444 whether the gate pulse supplied to rectifier circuit 110 should be increased by a step or maintained at the same number of steps. As shown in FIG. 4B, if the most recent OCT voltage measurement falls below a lower threshold (e.g., 14.0V)—indicating, for example, a battery with poor charge acceptance characteristics—the length of the gate pulse applied to rectifier circuit 110 is increased by a step at flow chart step 446. On the other hand, as indicated at step 448, if the OCT voltage measurement falls between the gassing potential threshold and the lower threshold, the charger neither increases nor decreases the number of gate pulse steps. The charger also determines whether the charging process should be terminated because for potential safety reasons (see step 450 and FIG. 4C) or for other reasons (see step 452 and FIG. 4D).

FIG. 4C is a flow chart of a safety cut-off process suitable for use with the charging process of FIG. 4B. At step 460, and preferably five minutes after the normal charging process begins, the charger turns the SCRs full on. Thereafter, at step 462, the charger measures the OCT voltage at the zero crossing time (Vz) and the peak applied voltage (Vp). At decision step 466, the charger compares the measured OCT voltage Vz with the peak applied voltage Vp. If the difference of Vp less Vz is greater than a predetermined battery limit (Vl), the charging process is terminated (step 468), and a bad battery indication is provided (step 470).

Figure 4D:
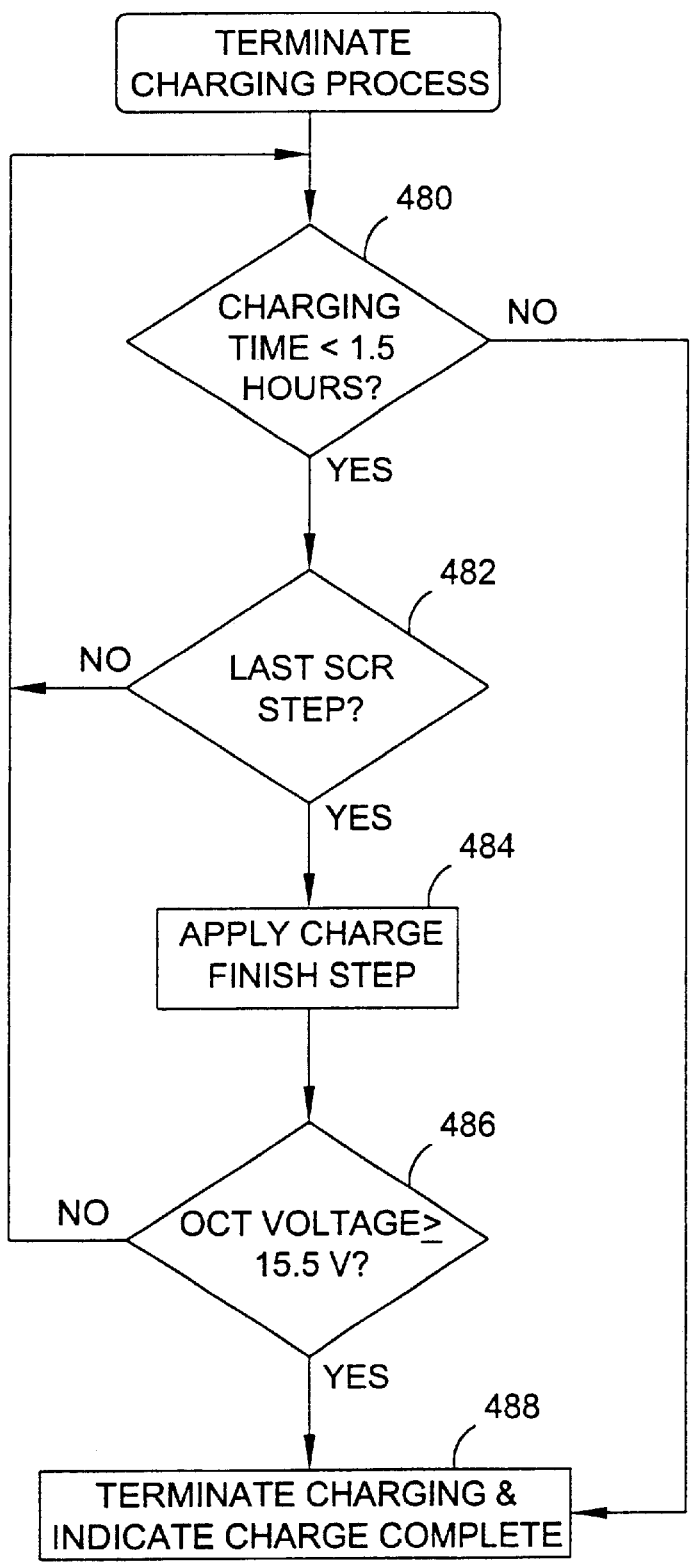
FIG. 4D is a flow chart of a charge termination process for use with the safety cut-off process of FIG. 4C.

FIG. 4D is a flow chart of a charge termination process. In particular, FIG. 4C illustrates the steps associated with the determination of whether to terminate the charging process. At step 480, the charger assesses the duration of the charge process and terminates the process if the charge time exceeds an upper threshold (e.g., 1.5 hours). If, on the other hand, the current charge time is less than the upper threshold, the charger determines, at decision step 482, the number of gate pulse steps is evaluated. If the charger has proceeded to the final gate pulse, the charger applies a finish charge at step 484. The finish charge process associated with initially sulfated batteries is generally the same as that used for conventional/flooded batteries. In particular, the finish charge process at step 484 involves pulsing the SCRs 112, 114 (FIG. 1) such that they are turned full on for a brief time (e.g., one second) followed by a brief rest time (e.g., 1 second). The finish charge step continues until the measured OCT voltage reaches a final value (e.g., 15.5 VDC), as reflected at decision step 486. When the OCT voltage reaches the final value the charging process proceeds to step 488, terminates and indicates that the charge is complete.

FIG. 5 is a flow chart of a battery charging method that monitors ripple voltage on the battery terminals to assess battery capacity. During the battery charging process, battery charger 100 (FIG. 1) measures the ripple voltage appearing at the battery terminals at step 510 (see also discussion above with respect to FIG. 1 and Table I). If the charger is not at the end of the charge process, as determined at step 512, the ripple voltage is compared to a threshold at step 514. If the ripple voltage exceeds the charging threshold at step 514, the battery is weak and a bad battery is declared at step 516. At step 518 the charging process terminates. If, however, the measured ripple voltage is less than the threshold, the threshold is updated at step 520 (e.g., the amount of tolerable ripple voltage is reduced) to reflect the fact that as the charge process continues the ripple voltage should decrease if the battery is good. The process preferably repeats periodically or at specific points during the charging process and terminates when the ripple voltage test fails or the charging process is otherwise completed.

As explained above with respect to FIG. 1, at the end of charge, SCRs 112, 114 are typically turned full on. At this state of charge, a good battery should exhibit little ripple voltage (see Table 1). Thus, at step 522, the method determines if the measured ripple voltage exceeds an end of charge threshold that is preferably a relatively stringent (e.g., 1.5 V for a non-sulfated, sealed battery). If the measured ripple voltage exceeds the end of charge threshold, a bad battery is declared at step 516 and the charging process terminates at step 518. If, however, the measured ripple voltage is less than the end of charge threshold at step 522, the battery is good (step 524) and the charging process terminates appropriately at step 518, in due course.

It should be understood that although FIG. 5 shows a process by which the threshold is updated at step 520 after each successful comparison, the process could be modified such that the threshold is not changed during the charging process. Other modifications are possible and contemplated by the method.

It is further to be understood that batteries may be charged with the voltage controlled charging method and systems disclosed and described herein using a switch mode power supply rather than a transformer-rectifier supply. The output voltage of the switch mode power supply could be programmed for turning the supply off, measuring the OCT voltage, and turning the supply back on at a level set by the voltage limits. Because there would be no ripple voltage, however, that aspect of the invention would not typically be implemented with such a charger. It is also noted that at the present time, switch mode power supplies generally cost more than transformer-rectifier systems.

It is to be understood that the steps described herein are not to be construed as having to be performed in the particular order discussed. It is also to be understood that additional or alternative steps may be employed with the present invention. Further, the specific and exemplary threshold voltages, tolerances, and similar values identified herein are illustrative and should not be read in a limiting sense.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of charging a battery having battery terminals, said method comprising:
    (a) initiating a battery charging process;
    (b) applying a charging signal to the battery terminals;
    (c) measuring a battery terminal voltage associated with the battery;
    (d) determining a ripple voltage component of the measured battery terminal voltage;
    (e) comparing the determined ripple voltage component to a ripple voltage limit having a first value;
    (f) decreasing the ripple voltage limit from the first value to a second value if the determined ripple voltage component is less the first value of the ripple voltage limit; and
    (g) terminating the battery charging process if the determined ripple voltage component is greater than the ripple voltage limit.

2. The method of claim 1 further comprising:
    (h) repeating steps (b), (c), (d), (e), (f), and (g) until the measured battery terminal voltage is greater than or equal to an end of charge voltage threshold or the charging process is terminated at step (g).

3. The method of claim 1 further comprising:
    determining if the battery is sulfated;
    performing a desulfation process if the battery is determined to be sulfated, said desulfation process comprising:
        applying a pulse charge voltage charging profile to the battery terminals; and
        applying a charge acceptance charging voltage profile to the battery terminals upon completion of the application of the pulse charge voltage charging profile.

4. The method of claim 1 wherein the battery further comprises an electrolyte and has a gassing potential at which the electrolyte tends to vaporize, said method further comprising:
    comparing the measured battery terminal voltage to a voltage threshold;
    determining a difference between the battery terminal voltage and the voltage threshold; and
    adjusting the charging signal as a function of the difference between the battery terminal voltage and the voltage threshold.

5. The method of claim 4 further comprising maintaining the charging signal such that the measured battery terminal voltage substantially remains below the gassing potential.

6. The method of claim 4 further comprising:
    determining if the battery is sulfated;
    performing a desulfation process if the battery is determined to be sulfated, said desulfation process comprising:
        applying a pulse charge voltage charging profile to the battery terminals; and
        applying a charge acceptance charging voltage profile to the battery terminals upon completion of the application of the pulse charge voltage charging profile.

7. The method of claim 1 wherein the applied charging signal comprises an applied charging voltage, said method further comprising:
    determining if the battery is sulfated;
    performing a desulfation process if the battery is determined to be sulfated, said desulfation process comprising:
        applying a desulfation pulse charge charging voltage profile to the battery terminals for a first time interval;
        applying a desulfation charge acceptance charging voltage profile to the battery terminals for a second time interval;
        executing a nonsulfated battery charging profile upon completion of the desulfation pulse charge charging voltage profile and the desulfation charge acceptance charging voltage profile comprising the steps of:
            comparing the measured battery terminal voltage to an upper voltage threshold;
            comparing the measured battery terminal voltage to a lower voltage threshold;
            increasing the applied charging voltage if the measured battery terminal voltage is below the lower voltage charging threshold;
            decreasing the applied charging voltage if the measured battery terminal voltage is above the upper voltage charging threshold; and
            performing a termination test and terminating the battery charging method if a termination criterion is satisfied.

8. The method of claim 1 wherein the battery further comprises an electrolyte and has a gassing potential at which the electrolyte tends to vaporize, and wherein the applied charging signal comprises an applied charging voltage, said method further comprising:
    comparing the measured battery terminal voltage to an upper voltage threshold;
    comparing the measured battery terminal voltage to a lower voltage threshold;
    increasing the applied charging voltage if the measured battery terminal voltage is below the lower voltage threshold; and
    decreasing the applied charging voltage if the measured battery terminal voltage is above the upper voltage threshold.

9. The method of claim 8 further comprising maintaining the applied charging voltage when the measured battery terminal voltage is above the lower voltage threshold and below the upper voltage threshold such that the measured battery terminal voltage substantially remains below the gassing potential.

10. The method claim 8 further comprising:

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

11. A method of charging a battery for a charging time, said battery having battery terminals, said method comprising:

initiating a battery charging process;

applying a charging signal to the battery terminals;

measuring a battery terminal voltage associated with the battery;

determining a ripple voltage component of the measured battery terminal voltage;

comparing the determined ripple voltage component to a ripple voltage limit having a first value;

terminating the charging process if the determined ripple voltage component is greater than the ripple voltage limit;

adjusting the ripple voltage limit as a function of the charging time such that the ripple voltage limit decreases from the first value to a second value as the charging time increases.

12. The method of claim 11 further comprising:

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

13. The method of claim 11 wherein the battery further comprises an electrolyte and has a gassing potential at which the electrolyte tends to vaporize, said method further comprising:

comparing the measured battery terminal voltage to a voltage threshold;

determining a difference between the battery terminal voltage and the voltage threshold; and adjusting the charging signal as a function of the difference between the battery terminal voltage and the voltage threshold.

14. The method of claim 13 further comprising maintaining the charging signal such that the measured battery terminal voltage substantially remains below the gassing potential.

15. The method of claim 13 further comprising:

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

16. The method of claim 11 wherein the applied charging signal comprises an applied charging voltage, said method further comprising:

determining if the battery is sulfated;

performing a desulfation process if the battery is determined to be sulfated, said desulfation process comprising:

applying a desulfation pulse charge charging voltage profile to the battery terminals for a first time interval;

applying a desulfation charge acceptance charging voltage profile to the battery terminals for a second time interval;

executing a nonsulfated battery charging profile upon completion of the desulfation pulse charge charging voltage profile and the desulfation charge acceptance charging voltage profile comprising the steps of:

comparing the measured battery terminal voltage to an upper voltage threshold;

comparing the measured battery terminal voltage to a lower voltage threshold;

increasing the applied charging voltage if the measured battery terminal voltage is below the lower voltage charging threshold;

decreasing the applied charging voltage if the measured battery terminal voltage is above the upper voltage charging threshold; and performing a termination test and terminating the battery charging method if a termination criterion is satisfied.

17. The method of claim 11 wherein the battery further comprises an electrolyte and has a gassing potential at which the electrolyte tends to vaporize, and wherein the applied charging signal comprises an applied charging voltage, said method further comprising:

comparing the measured battery terminal voltage to an upper voltage threshold;

comparing the measured battery terminal voltage to a lower voltage threshold;

increasing the applied charging voltage if the measured battery terminal voltage is below the lower voltage threshold; and decreasing the applied charging voltage if the measured battery terminal voltage is above the upper voltage threshold.

18. The method of claim 17 further comprising maintaining the applied charging voltage if the measured battery terminal voltage is above the lower voltage threshold and below the upper voltage threshold such that the measured battery terminal voltage substantially remains below the gassing potential.

19. The method of claim 17 further comprising:

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

20. A battery charger for charging a battery for a charging time, the battery including battery terminals, an electrolyte, and having a gassing potential at which the electrolyte tends to vaporize, said battery charger comprising:

a controller selectively providing a power control signal;

the controller including a monitoring function monitoring a voltage at the battery terminals;

a power application circuit applying a charging signal to the battery terminals in response to the power control signal;

the controller including a measuring function selectively measuring a ripple voltage associated with the voltage monitored at the battery terminals;

the controller including a ripple voltage comparing function comparing the monitored ripple voltage to a ripple voltage limit having a first value; and the controller including a limit adjusting function adjusting the ripple voltage limit as a function of the charging time, wherein the ripple voltage limit decreases from the first value to a second value as the charging time increases.

21. The battery charger of claim 20 wherein the controller includes a terminating function which terminates the power control signal when the monitored ripple voltage exceeds the ripple voltage limit thereby terminating the application of the charging signal to the battery terminals.

22. The battery charger of claim 21 wherein the controller includes a power control adjusting function which adjusts the power control signal in response to the voltage monitored at the battery terminals to substantially inhibit the power application circuit from applying the charging signal at a level above the battery gassing potential.

23. The battery charger of claim 22 wherein the controller includes a battery terminal comparing function which compares the voltage monitored at the battery terminals to a sulfation threshold voltage to determine the charge state of the battery and varies the power control signal such that the power application circuit applies a pulse charge to the battery terminals when the voltage monitored at the battery terminals is less than the sulfation threshold voltage.

24. A method of charging a battery including battery terminals, an electrolyte, and having a predetermined gassing potential at which the electrolyte tends to vaporize, the method comprising:

applying a charging signal to the battery terminals;

measuring a battery terminal voltage associated with the battery;

comparing the measured battery terminal voltage to a voltage threshold; and adjusting the applied charging signal as a function of the measured battery terminal voltage such that the measured battery terminal voltage substantially remains below the predetermined gassing potential;

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

25. A method of charging a battery including battery terminals, an electrolyte, and having a predetermined gassing potential at which the electrolyte tends to vaporize, the method comprising:

applying a charging signal to the battery terminals;

measuring a battery terminal voltage associated with the battery;

comparing the measured battery terminal voltage to a voltage threshold; and adjusting the applied charging signal as a function of the measured battery terminal voltage such that the measured battery terminal voltage substantially remains below the predetermined gassing potential;

determining if the battery is sulfated;

performing a desulfation process if the battery is determined to be sulfated, said desulfation process comprising:

applying a desulfation pulse charge charging voltage profile to the battery terminals for a first time interval; and applying a desulfation charge acceptance charging voltage profile to the battery terminals for a second time interval.

26. A method of charging a battery including battery terminals, an electrolyte, and having a predetermined gassing potential at which the electrolyte tends to vaporize, the method comprising:

applying an initial charging voltage to the battery terminals;

measuring at the battery terminals a battery terminal voltage associated with the battery;

comparing the measured battery terminal voltage to an upper voltage threshold;

comparing the measured battery terminal voltage to a lower voltage threshold;

increasing the applied charging voltage if the measured battery terminal voltage is less than the lower voltage threshold;

decreasing the applied charging voltage if the measured battery terminal voltage above the upper voltage threshold; and maintaining the applied charging voltage if the measured battery terminal voltage is above the lower voltage threshold and below the upper voltage threshold, such that the measured battery terminal voltage substantially remains below the predetermined gassing potential.

27. The method of claim 26 further comprising:

determining if the battery is sulfated;

performing a desulfation process if the battery is determined to be sulfated, said desulfation process comprising:

applying a pulse charge voltage charging profile to the battery terminals; and applying a charge acceptance charging voltage profile to the battery terminals upon completion of the application of the pulse charge voltage charging profile.

28. The method of claim 26 further comprising:

determining if the battery is sulfated;

performing a desulfation process if the battery is determined to be sulfated, said desulfation process comprising:

applying a desulfation pulse charge charging voltage profile to the battery terminals for a first time interval; and applying a desulfation charge acceptance charging voltage profile to the battery terminals for a second time interval.

29. A battery charger for charging a battery including battery terminals, an electrolyte, and having a predetermined gassing potential at which the electrolyte tends to vaporize, said battery charger comprising:
- a controller selectively providing a power control signal;
- the controller including a monitoring function monitoring a voltage at the battery terminals;
- a power application circuit selectively applying a charging signal to the battery terminals in response to the power control signal; and
- the controller including:
  - an adjusting function adjusting the power control signal in response to the voltage monitored at the battery terminals such that the power control signal is adjusted to substantially inhibit the power application circuit from applying the charging signal at a level above the predetermined gassing potential; and
  - a comparing function which compares the voltage monitored at the battery terminals to a sulfation threshold voltage to determine the charge state of the battery, said controller varying the power control signal such that the power application circuit applies a pulse charge to the battery terminals when the voltage monitored at the battery terminals is less than the sulfation threshold voltage.

30. A method of charging a battery having battery terminals, said method comprising:
- initiating a battery charging process;
- applying a charging signal to the battery terminals;
- measuring a battery terminal voltage associated with the battery;
- determining a ripple voltage component of the measured battery terminal voltage;
- comparing the determined ripple voltage component to a ripple voltage limit having a first value;
- adjusting the ripple voltage limit from the first value to a second value as a function of a difference between the determined ripple voltage component and the ripple voltage limit;
- determining if the battery is sulfated;
- performing a desulfation process if the battery is determined to be sulfated, said desulfation process comprising:
  - applying a pulse charge voltage charging profile the battery terminals; and
  - applying a charge acceptance charging voltage profile to the battery terminals upon completion of the application of the pulse charge voltage charging profile.

31. A method of charging a battery comprising battery terminals, an electrolyte, and having a gassing potential at which the electrolyte tends to vaporize, said method comprising:
- initiating a battery charging process;
- applying a charging signal to the battery terminals;
- measuring a battery terminal voltage associated with the battery;
- determining a ripple voltage component of the measured battery terminal voltage;
- comparing the determined ripple voltage component to a ripple voltage limit having a first value;
- adjusting the ripple voltage limit from the first value to a second value as a function of a difference between the determined ripple voltage component and the ripple voltage limit;
- comparing the measured battery terminal voltage to a voltage threshold;
- determining a difference between the battery terminal voltage and the voltage threshold; and
- adjusting the charging signal as a function of the difference between the battery terminal voltage and the voltage threshold such that the measured battery terminal voltage substantially remains below the gassing potential.

32. A method of charging a battery comprising battery terminals, an electrolyte, and having a gassing potential at which the electrolyte tends to vaporize, said method comprising:
- initiating a battery charging process;
- applying a charging voltage to the battery terminals;
- measuring a battery terminal voltage associated with the battery;
- determining a ripple voltage component of the measured battery terminal voltage;
- comparing the determined ripple voltage component to a ripple voltage limit having a first value;
- adjusting the ripple voltage limit from the first value to a second value as a function of a difference between the determined ripple voltage component and the ripple voltage limit;
- comparing the measured battery terminal voltage to an upper voltage threshold;
- comparing the measured battery terminal voltage to a lower voltage threshold;
- increasing the applied charging voltage if the measured battery terminal voltage is below the lower voltage threshold; and
- decreasing the applied charging voltage if the measured battery terminal voltage is above the upper voltage threshold.

* * * * *